(12) United States Patent
Ju et al.

(10) Patent No.: US 10,853,664 B2
(45) Date of Patent: Dec. 1, 2020

(54) DEVICE AND METHOD FOR DETECTING ABNORMAL SITUATION

(71) Applicant: S-1 CORPORATION, Seoul (KR)

(72) Inventors: Jin Sun Ju, Seoul (KR); Hwijun Kim, Seoul (KR); Hyang Sook Choi, Incheon (KR)

(73) Assignee: S-1 CORPORATION, Seoul (KR)

( * ) Notice: Subject to any disclaimer, the term of this patent is extended or adjusted under 35 U.S.C. 154(b) by 52 days.

(21) Appl. No.: 16/094,971

(22) PCT Filed: Jul. 20, 2016

(86) PCT No.: PCT/KR2016/007913
§ 371 (c)(1),
(2) Date: Oct. 19, 2018

(87) PCT Pub. No.: WO2017/183769
PCT Pub. Date: Oct. 26, 2017

(65) Prior Publication Data
US 2019/0095720 A1 Mar. 28, 2019

(30) Foreign Application Priority Data
Apr. 22, 2016 (KR) ........................ 10-2016-0049593

(51) Int. Cl.
*G06K 9/00* (2006.01)
*H04N 13/20* (2018.01)
(Continued)

(52) U.S. Cl.
CPC ..... *G06K 9/00778* (2013.01); *G06K 9/00214* (2013.01); *G06K 9/00275* (2013.01);
(Continued)

(58) Field of Classification Search
CPC ............ G06K 9/00288; G06K 9/00355; G06K 9/6212; G06K 9/00214; G06K 9/00778;
(Continued)

(56) References Cited

U.S. PATENT DOCUMENTS

| 2010/0296702 | A1 | 11/2010 | Rogers et al. |
| 2012/0076361 | A1* | 3/2012 | Fujiyoshi ................ G01S 17/89 382/103 |
| 2014/0139633 | A1 | 5/2014 | Wang et al. |
| 2014/0347479 | A1* | 11/2014 | Givon ................ G06K 9/00342 348/143 |

FOREIGN PATENT DOCUMENTS

| CN | 103279791 A | 9/2013 |
| CN | 104410793 A | 3/2015 |

(Continued)

OTHER PUBLICATIONS

International Search Report of PCT Application No. PCT/KR2016/007913, dated Jan. 9, 2017.
(Continued)

*Primary Examiner* — Phuoc H Doan
(74) *Attorney, Agent, or Firm* — Pearl Cohen Zedek Latzer Baratz LLP

(57) ABSTRACT

Provided is a detection method of a detection device. The detection device detects at least one object from an image by using depth information about the image obtained by a camera. The detection device identifies whether said at least one object is a person through three-dimensional (3D) head model matching, which matches a head candidate area of said at least one object with a 3D head model. The detection device calculates a feature for detection of a situation by using said at least one object when it is identified that said at least one object is the person.

18 Claims, 23 Drawing Sheets

(51) Int. Cl.
*H04N 7/18* (2006.01)
*G06K 9/46* (2006.01)
*G06K 9/62* (2006.01)
*H04N 13/271* (2018.01)

(52) U.S. Cl.
CPC ....... *G06K 9/00362* (2013.01); *G06K 9/4642* (2013.01); *G06K 9/6212* (2013.01); *G06K 9/6215* (2013.01); *H04N 7/18* (2013.01); *H04N 7/183* (2013.01); *H04N 13/20* (2018.05); *H04N 13/271* (2018.05)

(58) Field of Classification Search
CPC ............. G06K 9/00362; G06K 9/6215; G06K 9/4642; G06T 15/04
USPC ......... 382/103, 116, 154, 294; 345/635, 473
See application file for complete search history.

(56) References Cited

FOREIGN PATENT DOCUMENTS

| | | |
|---|---|---|
| CN | 105517680 A | 4/2016 |
| KR | 10-2003-0018487 A | 3/2003 |
| KR | 10-2011-0038983 A | 4/2011 |
| KR | 10-1421962 B1 | 7/2014 |
| KR | 10-1454548 B1 | 10/2014 |
| KR | 10-2015-0068709 A | 6/2015 |
| KR | 10-2016-0011523 A | 2/2016 |
| KR | 10-1593187 B1 | 2/2016 |
| KR | 10-2016-0041441 A | 4/2016 |

OTHER PUBLICATIONS

Office Action for Chinese Patent Application No. 201680084843.1, dated Mar. 27, 2020.

* cited by examiner

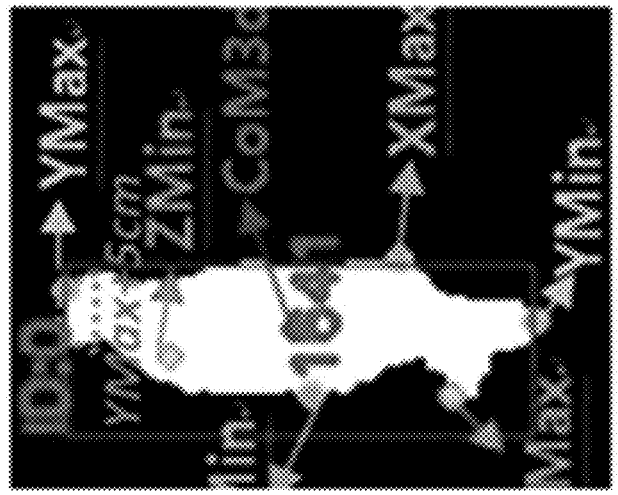
FIG. 9B

FIG. 10B
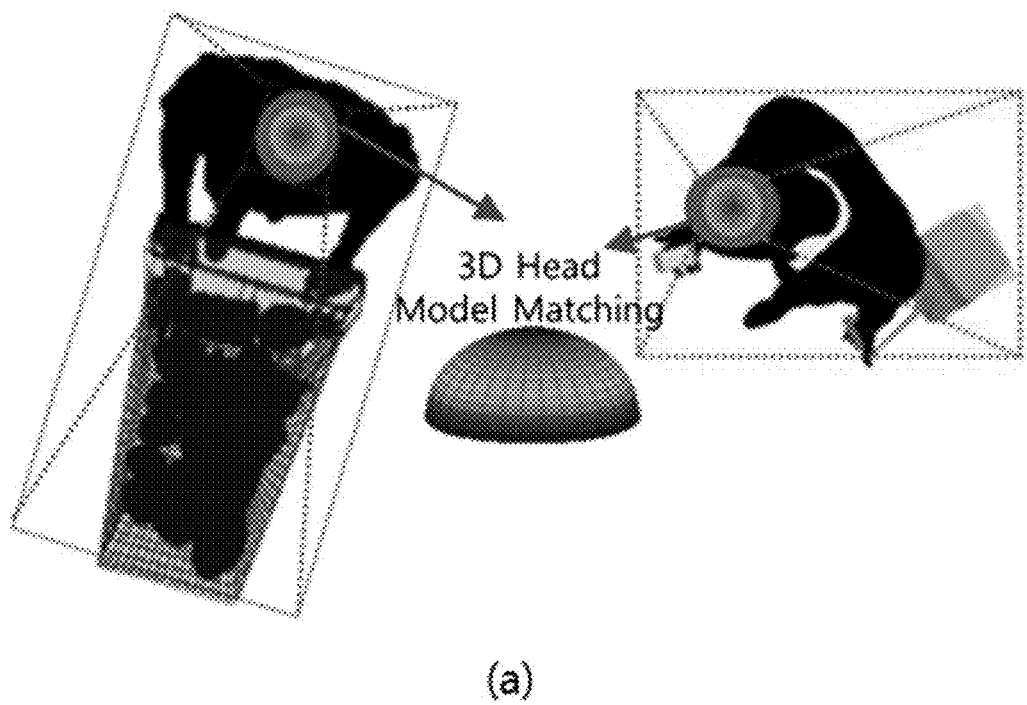
(a)
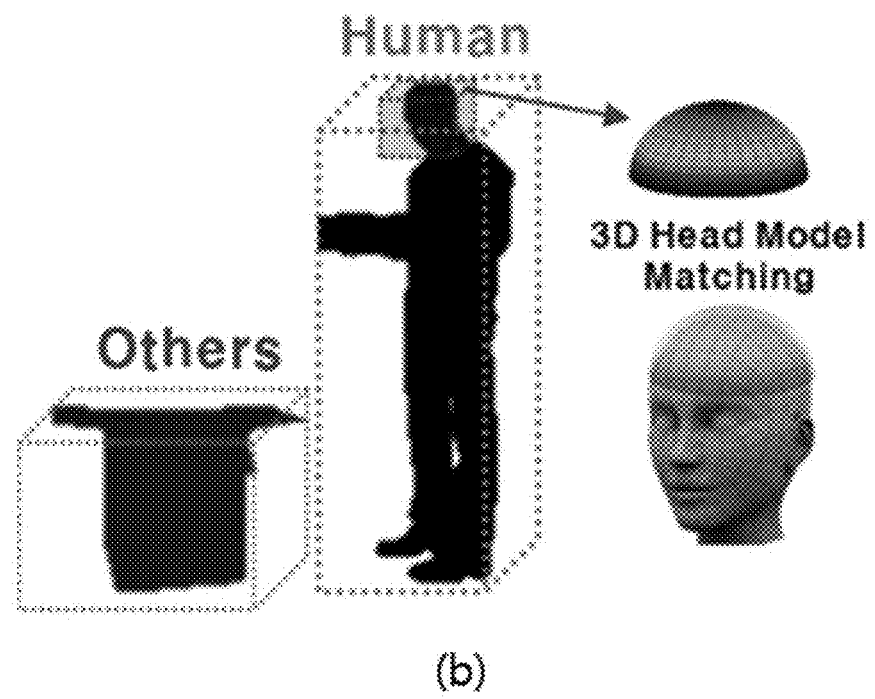
(b)

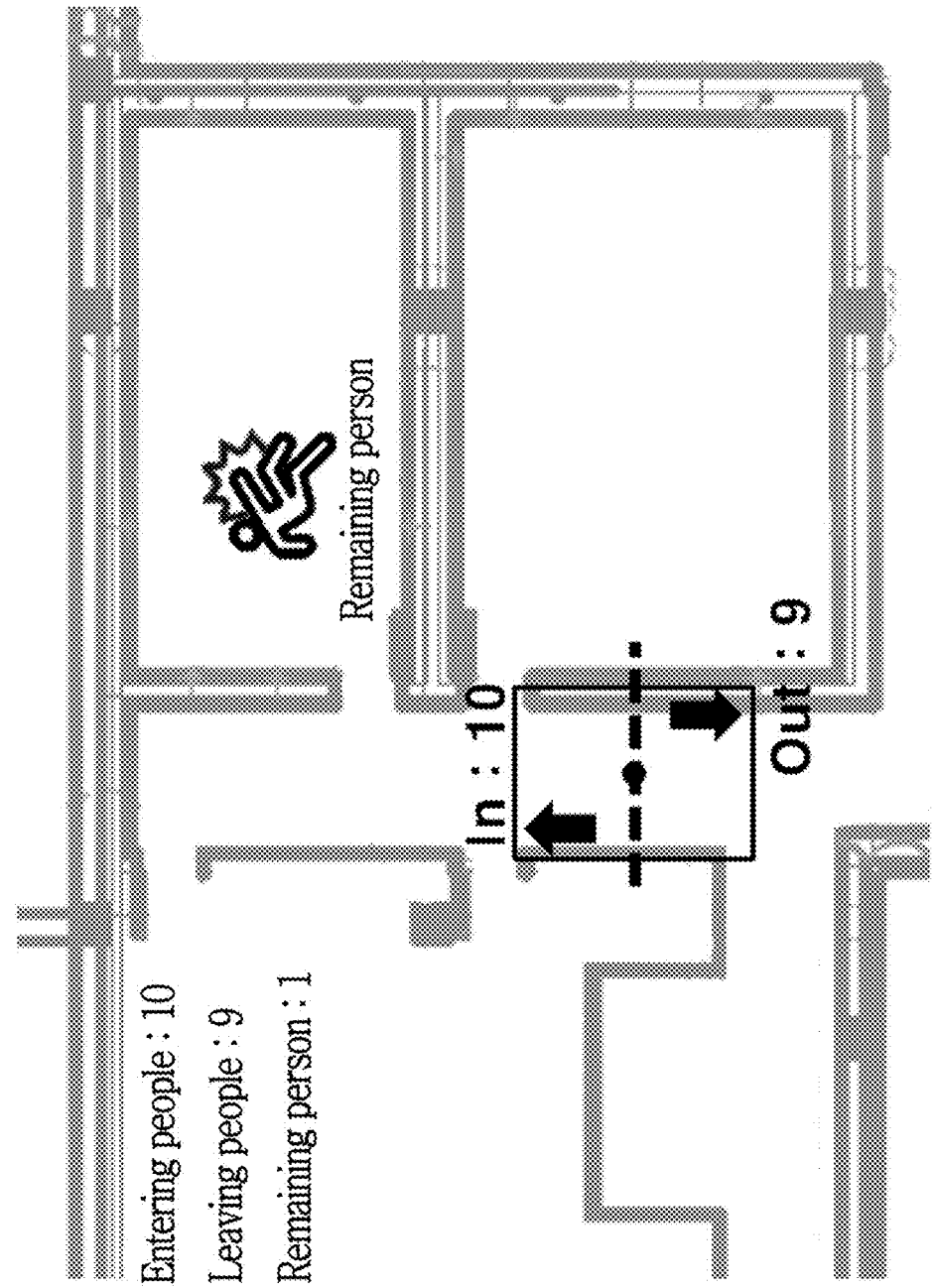

DEVICE AND METHOD FOR DETECTING ABNORMAL SITUATION

CROSS-REFERENCE TO RELATED APPLICATIONS

This application is a National Phase Application of PCT International Application No. PCT/KR2016/007913, International Filing Date Jul. 20, 2016, claiming priority of Korean Patent Application No. 10-2016-0049593, filed Apr. 22, 2016, which is hereby incorporated by reference.

FIELD OF THE INVENTION

Technical Field

The present invention relates to a method and a device for detecting an abnormal situation by using three-dimensional image information.

BACKGROUND OF THE INVENTION

A closed circuit television (CCTV) system is applied to various fields as an image monitoring device. In a CCTV as an existing monitoring device, a person directly checks most of the photographed contents through an analog video recorder (AVR), a digital video recorder (DVR), a network video recorder (NVR), and the like and identifies an abnormal behavior. Accordingly, many operating people are required, and the operating people easily miss an object or a behavior, which needs to be identified.

Research shows that when one person monitors two or more CCTVs for 22 minutes or more, the person cannot detect 95% or more of the important events.

Accordingly, there has been actively developed an intelligent CCTV, which automatically detects a specific object or an action of a person, notifies a user of the detected object or action of the person, and enables the user to rapidly take measures against an abnormal behavior within a need to monitoring an image for 24 hours.

Recently, there are increasing attempts to utilize a mover count, a movement path analysis, crowd density analysis, and the like of a specific space (for example, a store) as marketing materials.

There is a need for a remaining person detecting technology, in such cases where a remaining child died (February, 2012, a girl left alone in a light-out gymnasium died in a daycare center due to a heart attack), the case where an operator left alone in a dangerous working area died (July, 2015, the operator working alone in the dangerous working area while violating the regulation died), the case where a person wandering a rooftop of a skyscraper died (January, 2015, the person wandering the rooftop for a long time had fallen and died), and the like.

In the meantime, in order to count a mover, analyze crowd density, and detect a remaining person, an infrared sensor scheme and a single camera scheme are mainly used.

The infrared sensor scheme is a method, in which several infrared sensors are installed in a detection area and a distance of a person or an object approaching the sensor is measured and counted. In the infrared sensor scheme, the rapid and simple counting is possible. However, in the infrared sensor scheme, erroneous counting is frequently incurred due to light disturbance, and a controller for collecting data obtained from the several sensors is separately required. Further, in the infrared sensor scheme, image data cannot be obtained, so that it is not easy to discriminate and manage truth and false, and it is impossible to separate and count a plurality of overlapping people, and it is difficult to discriminate a person and an object, thereby degrading accuracy of counting.

The single camera scheme is a method of processing an image input through one camera and counting a mover. In the single camera scheme, performance is slightly different according to an applied image processing method. The single camera scheme detects a person and extracts a feature by using only color information, so that the single camera scheme sensitively reacts to a change in a surrounding environment (for example, a change in lighting, shadow, and covering of an image by an object) to cause a high error rate.

SUMMARY OF THE INVENTION

The present invention has been made in an effort to provide a method and a device for counting a mover by using a three-dimensional camera providing depth information, and detecting crowd density and a remaining person based on the number of movers.

An exemplary embodiment of the present invention provides a detection method of a detection device. The detection method includes: detecting at least one object from an image by using depth information about the image obtained by a camera; identifying whether said at least one object is a person through three-dimensional (3D) head model matching, which matches a head candidate area of said at least one object with a 3D head model; and calculating a feature for detection of a situation by using said at least one object when it is identified that said at least one object is the person.

The identifying may include designating a circle area, which is based on at least one of a first pixel having a minimum depth value based on the camera among pixels of said at least one object and a second pixel having a maximum height value based on a floor area of the image, and has a predetermined radius, as a first head candidate area.

The identifying may further include: when a radio of the number of pixels of the first head candidate area to the number of entire pixels of said at least one object is a first threshold value or less, calculating a remaining area except for the first head candidate area in an area of said at least one object; extracting at least one of a third pixel having a minimum depth value based on the camera among pixels of the remaining area and a fourth pixel having a maximum height value based on the floor area; and designating a circle area, which is based on at least one of the third pixel and the fourth pixel and has a predetermined radius, as a second head candidate area.

The identifying may further include: generating the 3D head model having a predetermined depth; and calculating a Bhattacharyya distance between the first head candidate area and the 3D head model.

The calculating of the Bhattacharyya distance may include: generating a first histogram and a second histogram by applying depth-based histogram projection to the first head candidate area and the 3D head model; and calculating the Bhattacharyya distance by using the first histogram and the second histogram.

The identifying may further include identifying an object including the first head candidate area among said at least one object as a person when the Bhattacharyya distance is a first threshold value or less.

The calculating of the feature for the detection of the situation may include: setting a count line; setting a virtual count line at a position spaced by a predetermined distance from the count line; and counting the number of movers when a center point of said at least one object passes the count line and the virtual count line.

The virtual count line may include a first virtual count line set at a position spaced by a predetermined distance from the count line in a first direction and a second virtual count line set at a position spaced by a predetermined distance from the count line in a second direction that is opposite to the first direction.

The counting may include: counting the number of movers in the first direction when a center point of said at least one object sequentially passes the count line and the first virtual count line; and counting the number of movers in the second direction when the center point of said at least one object sequentially passes the count line and the second virtual count line.

The calculating of the feature for the detection of the situation may include: calculating a difference between the number of movers in the first direction and the number of movers in the second direction; measuring a staying time of a remaining person corresponding to the difference; and making a notification when the staying time is a first threshold value or more.

The calculating of the feature for the detection of the situation may include: calculating a first value that is an extent of a floor area of the image; calculating a second value that is a width of said at least one object; and calculating crowd density by using the first value and the second value.

The calculating of the first value may include: calculating a first area closest to the camera and a second area farthest from the camera in the floor area; calculating a first point that is the leftmost point and a second point that is the rightmost point among points of the first area; calculating a third point that is the leftmost point and a fourth point that is the rightmost point among points of the second area; and calculating a horizontal length and a vertical length of the floor area by using the first point, the second point, the third point, and the fourth point.

The calculating of the feature for the detection of the situation may further include detecting crowd forming when the crowd density is a first threshold value or more.

The image may include a first area, which is spaced from a floor area of the image by a first height and is spaced from the camera by a first depth.

The detecting of said at least one object may include: calculating a first threshold value for the first area based on the first height and the first depth; and detecting the first area as an object when a difference between a background model of the image and the first height is the first threshold value or more.

Another exemplary embodiment of the present invention provides a detection device. The detection device includes: an object detecting unit, which detects at least one object by using depth information about an image obtained by a camera; an identifying unit, which compares a head candidate area of said at least one object and a 3D head model and identifies whether said at least one object is an object of a target type; and a recognition feature calculating unit, which calculates a feature for detection of a situation by using said at least one object when it is identified that said at least one object is the object of the target type.

According to the exemplary embodiments of the present invention, it is possible to improve accuracy of detection and decrease a false feature by using a 3D camera.

Further, according to the exemplary embodiments of the present invention, it is possible to accurately extract a 3D feature by performing detection of a floor of a detection space regardless of an installation position of a 3D camera.

Further, according to the exemplary embodiments of the present invention, it is possible to accurately separate overlapping objects into individual objects by using distance information-based labelling.

Further, according to the exemplary embodiments of the present invention, it is possible to accurately identify a person and an object by using 3D head model matching.

Further, according to the exemplary embodiments of the present invention, it is possible to succeed in separate recognition even when it is difficult to separately recognize movers in counting movers. For example, according to the exemplary embodiments of the present invention, it is possible to identify and count both a child and an adult even when the adult carries the child. For another example, according to the exemplary embodiments of the present invention, it is possible to identify and count a person even when the person holds or draws luggage.

Further, according to the exemplary embodiments of the present invention, it is possible to detect an object even in a sensitive place, in which it is difficult to utilize image information, by forming an image with depth information. For example, the device according to the exemplary embodiments of the present invention may be installed even in a place, such as a bathhouse and a fitting room, in which privacy needs to be secured.

Further, according to the exemplary embodiments of the present invention, color information is not used, so that it is possible to consistently recognize an object even in a change in lighting and an environment.

Further, according to the exemplary embodiments of the present invention, it is possible to prevent an accident by detecting a remaining person by utilizing mover counting information. Particularly, according to the exemplary embodiments of the present invention, even though an additional sensor or camera is not installed in a space, in which it is necessary to detect a remaining person, it is possible to detect a remaining person by utilizing time, at which counted movers enter and leave.

BRIEF DESCRIPTION OF THE DRAWINGS

FIGS. 9A, 9B, and 9C are diagrams illustrating a head model generating process and a head candidate area designating process in a person identifying process according to the exemplary embodiment of the present invention.

FIG. 10B is a diagram illustrating a three-dimensional (3D) head model matching result according to the exemplary embodiment of the present invention.

FIG. 11C is a diagram illustrating a remaining person detection method according to the exemplary embodiment of the present invention.

DETAILED DESCRIPTION OF THE INVENTION

Figure 1:
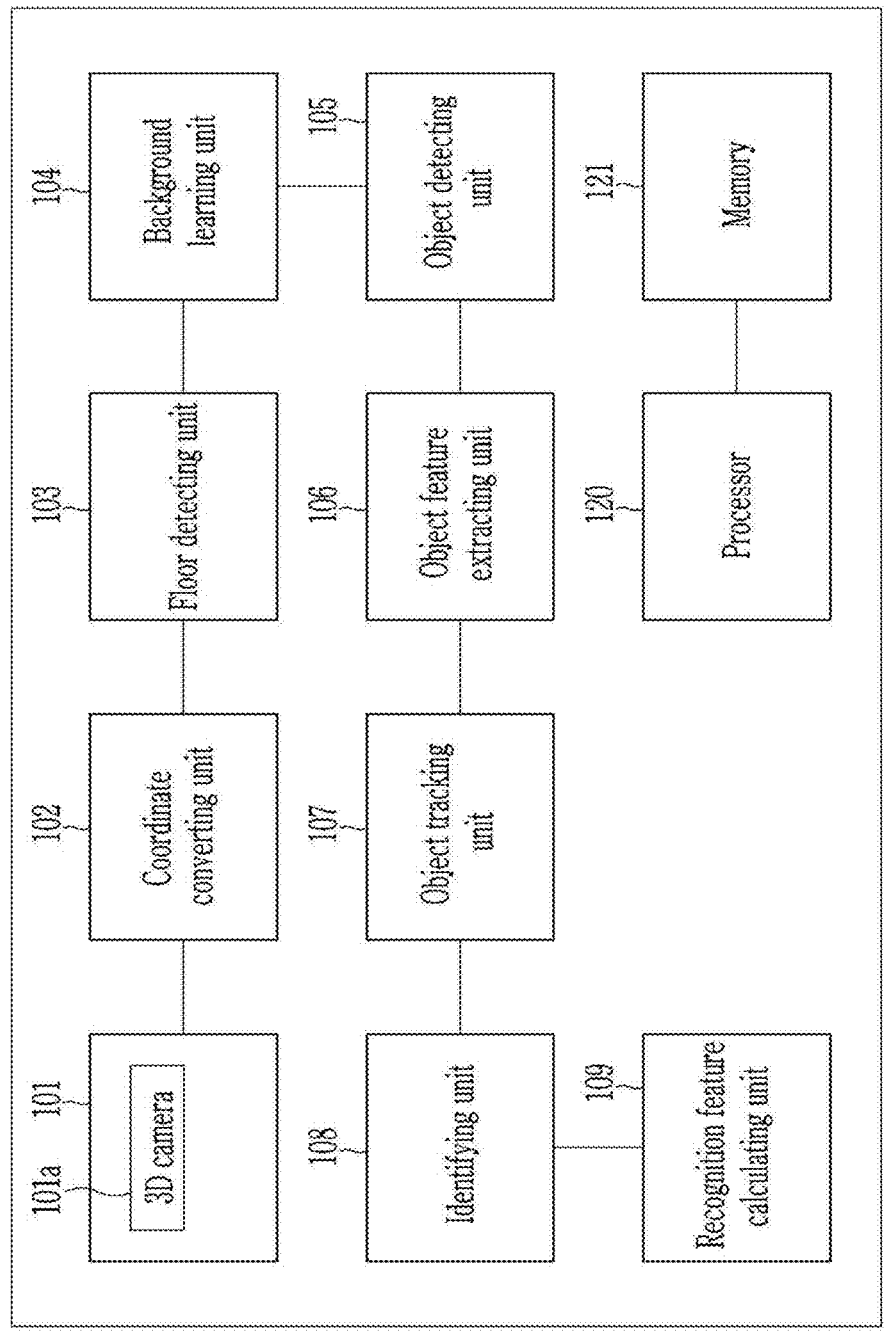
FIG. 1 is a diagram illustrating a detection device according to an exemplary embodiment of the present invention.

In the following detailed description, only certain exemplary embodiments of the present invention have been shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive. Like reference numerals designate like elements throughout the specification.

Throughout this specification and the claims that follow, when it is described that an element is "coupled" to another element, the element may be "directly coupled" to the other element or "electrically coupled" to the other element through a third element.

Throughout the specification and the claims, unless explicitly described to the contrary, the word "comprise" and variations such as "comprises" or "comprising", will be understood to imply the inclusion of stated elements but not the exclusion of any other elements.

In the meantime, in the present specification, 'A or B' may include 'A', 'B', or 'both A and B'.

In the present specification, an object may refer to a person, an animal, or an object. Hereinafter, for convenience of the description, the present invention is described on an assumption that an object is a person, but the scope of the present invention is not limited thereto.

Figure 2:
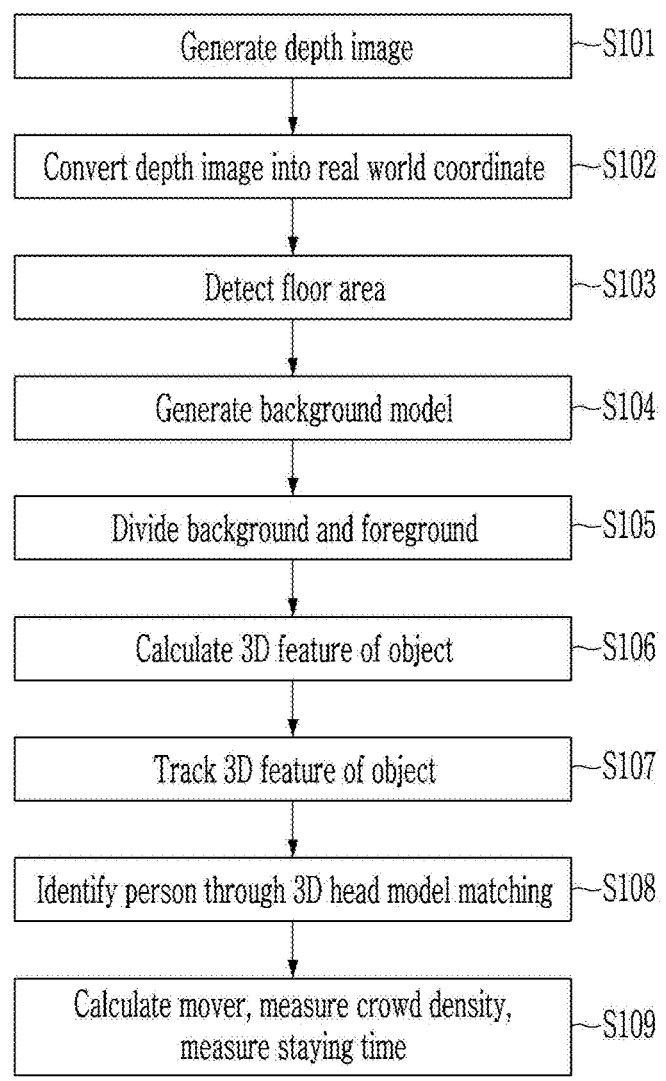
FIG. 2 is a diagram illustrating a detection method of the detection device according to an exemplary embodiment of the present invention.

FIG. 1 is a diagram illustrating a detection device 100 according to an exemplary embodiment of the present invention. FIG. 2 is a diagram illustrating a detection method of the detection device 100 according to an exemplary embodiment of the present invention.

The detection device 100 includes a depth image generating unit 101, a coordinate converting unit 102, a floor detecting unit 103, a background learning unit 104, an object detecting unit 105, an object feature extracting unit 106, an object tracking unit 107, an identifying unit 108, a recognition feature calculating unit 109, a processor 120, and a memory 121. The background learning unit 104 and the object detecting unit 105 correspond to detectors, and the object feature extracting unit 106 and the object tracking unit 107 correspond to trackers, and the identifying unit 108 and the recognition feature calculating unit 109 correspond to recognizers.

The depth image generating unit 101 generates a depth image by using depth information (distance information) obtained by a three-dimensional (3D) camera 101a (S101). That is, the depth image includes the depth information. FIG. 1 illustrates the case where the 3D camera 101a is included in the depth image generating unit 101 as an example, but the 3D camera 101a may be a separate device discriminated from the detection device 100. The 3D camera 101a is installed in a monitoring area, which is desired to be monitored, and photographs an image of the monitoring area.

For example, the 3D camera 101a may be installed on a ceiling or a wall surface of the monitoring area. The 3D camera 101a may be implemented by a time of flight (TOF) camera, a structured light-scheme camera, a laser range finder (LRF) sensor and the like providing depth information.

Figure 3A:
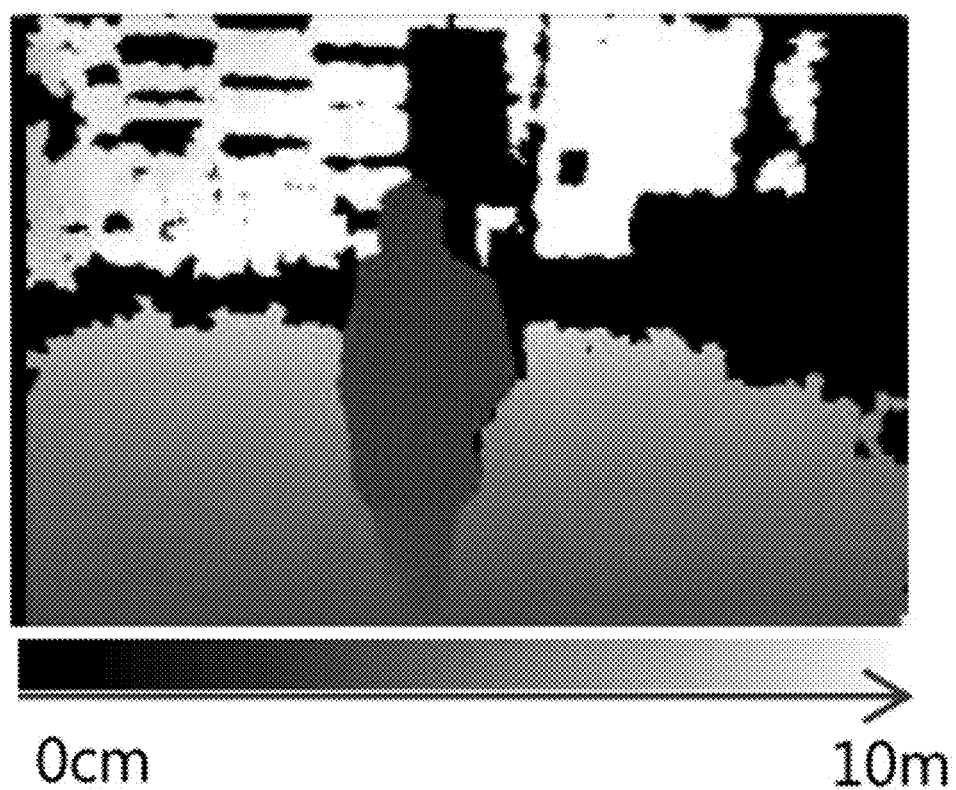
FIGS. 3A and 3B are diagrams illustrating depth images according to the exemplary embodiment of the present invention.

Particularly, as exemplified in FIG. 3A, the depth image generating unit 101 may normalize the depth information obtained by the 3D camera 101a to a value between 0 to 255, and express the depth information in a gray scale image. FIG. 3A illustrates a gray scale image having a depth range (distance range) of 0 cm to 10 cm as an example.

Figure 3B:
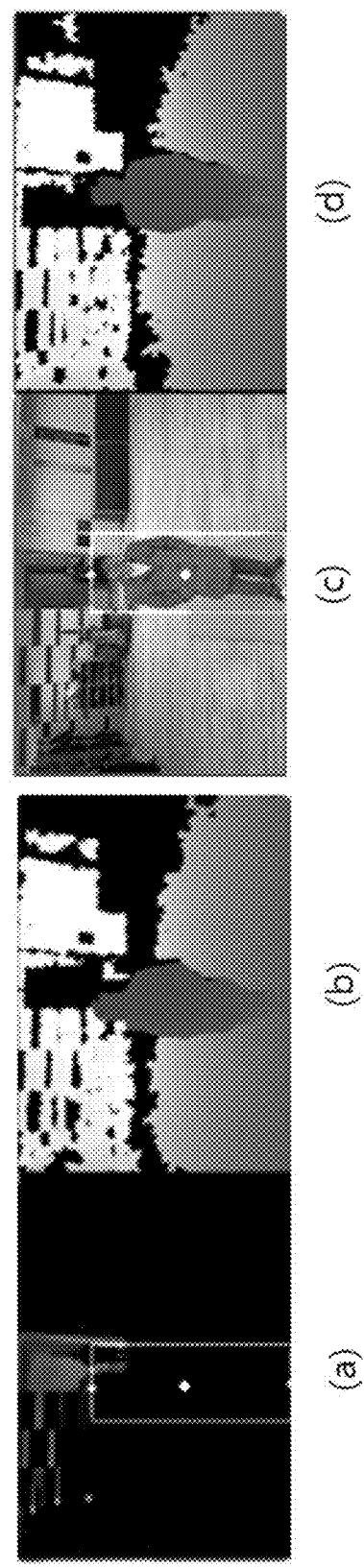

FIG. 3B illustrates a difference between a general image (color image) and a depth image as an example. Particularly, in FIG. 3B, (a) represents a general image when there is no lighting, and (b) represents a depth image when there is no lighting. Further, in FIG. 3B, (c) represents a general image when there is a light, and (d) represents a depth image when there is a light.

The coordinate converting unit 102 converts the depth image into a rear world coordinate (that is, a 3D coordinate) by using the depth information with respect to a Z-axis (S102). Particularly, the coordinate converting unit 102 may match the two-dimensional (2D) image (color image) and the 3D depth image and estimate a 3D depth value, which the coordinate of the 2D image has. The 3D camera 101a provides only the distance information (depth information) with respect to the Z-axis, so that the coordinate converting unit 102 converts all of the pixels of the depth image into a 3D coordinate by using Equation 1 below.

$$X_{rw} = \left(\frac{X}{W} - 0.5\right) \times Z_{rw} \times const_x$$

$$Y_{rw} = \left(0.5 - \frac{Y}{H}\right) \times Z_{rw} \times const_y$$

(Equation 1)

In Equation 1, $X_{rw}$ represents an X-axis real word coordinate, $Y_{rw}$ represents a Y-axis real word coordinate, and $Z_{rw}$ represents a distance (depth) provided by the 3D camera 101a. In Equation 1, W represents a width of the image and H represents a height of the image. In Equation 1, X and Y represent 2D pixel coordinates of the image, $const_x$ is $$\tan\left(\frac{FovH}{2}\right) \times 2,$$

and FovH represents a horizontal view angle of the 3D camera 101a. Further, in Equation 1, $const_y$ is $$\tan\left(\frac{FovV}{2}\right) \times 2,$$

and FovV represents a vertical view angle of the 3D camera 101a.

The floor detecting unit 103 defines a floor plane and detects a floor area by using the depth information obtained by the 3D camera 101a (S103). Particularly, the floor detecting unit 103 detects a floor surface from the entire image by using the real world coordinate (3D coordinate) transmitted from the coordinate converting unit 102 for a predetermined initial time, and calculates a plane reference distance value for all of the pixels of the image. Herein, the plane reference distance value d represents how far all of the pixels (3D coordinate) are separated from the floor plane. Information about the floor plane detected by the floor area detecting unit 103 may be used in background model learning, object detection, and object feature extraction processes, which are to be described below. The floor detecting unit 103 calculates a floor plane and a plane reference distance value by using Equations 2 to 5 below.

$$p_1 = \{x_1, y_1, z_1\}, p_2 = \{x_2, y_2, z_2\}, p_3 = \{x_3, y_3, z_3\},$$ (Equation 2)

In Equation 2, $p_1$, $p_2$, and $p_3$ are three points passing the plane. $p_1$, $p_2$, and $p_3$ may be obtained by method M100 or method M101.

In method M100, $p_1$, $p_2$, and $p_3$ have real world coordinate values of three points set by a user.

In method M101, one point, in which $Y_{rw}$ (the case where the 3D camera 101a is installed on the wall surface) or $Z_{rw}$ (the case where the 3D camera 101a is installed on the ceiling) has a minimum value, is selected, all of $X_{rw}$, $Y_{rw}$, and $Z_{rw}$ searched in surrounding upper, lower, left, and right areas of 5 cm around the selected point are accumulated, an average of the accumulated values is calculated, and the average is designated as $p_1$. Further, in method M101, the upper, lower, left, and right areas of 50 cm around a place, in which $z_1$ of $p_1$ (the case where the 3D camera 101a is installed on the wall surface) or $x_1$ of $p_1$ (the case where the 3D camera 101a is installed on the ceiling) is 80 cm or more, are searched, one point, in which a difference between $x_1$ of $p_1$ and $y_1$ of $p_1$ is a threshold value or less, is selected, $X_{rw}$, $Y_{rw}$, $Z_{rw}$ are accumulated by searching the upper, lower, left, and right areas of 5 cm around the selected point, an average of the accumulated values is obtained, and the average is designated as $p_2$. In method M101, $p_3$ is calculated by the same method as the method of calculating $p_2$.

That is, in method M101, one point, in which $Y_{rw}$ has a minimum value in the 3D coordinate (real world coordinate), is defined as $p_1$. In method M101, upper, lower, left, and right areas of 50 cm around the place, which is 80 cm or more than $z_1$ of $p_1$, are searched, and one point, in which a difference between $z_1$ of $p_1$ and $y_1$ of $p_1$ is a threshold value or less, is defined as $p_2$. In method M101, upper, lower, left, and right areas of 50 cm around the place, which is 80 cm or more than $z_2$ of $p_2$, are searched, and one point, in which a difference between $z_2$ of $p_2$ and $y_2$ of $p_2$ is a threshold value or less, is defined as $p_3$. Herein, 80 cm, 50 cm, and 5 cm are values predetermined according to a size of an image, and may be changed according to a size of an image.

By using the three points $p_1$, $p_2$, and $p_3$ of Equation 2, a plane equation of Equation 3 below may be obtained.

$$ax + by + cz = d$$ (Equation 3)

Equation 3 represents a plane passing $p_1$, $p_2$, and $p_3$. In Equation 3, a, b, and c represent coefficients of a plane equation, and may be counted by Equation 4 below.

$$a = y_1(z_2 - z_3) + y_2(z_3 - z_1) + y_3(z_1 - z_2)$$

$$b = z_1(x_2 - x_3) + z_2(x_3 - x_1) + z_3(x_1 - x_2)$$

$$c = x_1(y_2 - y_3) + x_2(y_3 - y_1) + x_3(y_1 - y_2)$$ (Equation 4)

In Equation 3, d represents a plane reference distance value, and may have a value of 0 with respect to the three points $p_1$, $p_2$, and $p_3$ of the floor area. The plane reference distance value d may be obtained by Equation 5 below.

$$d = a*(\text{realworld}X - \text{ptPoint}X) + b*(\text{realworld}Y - \text{ptPoint}Y) + c*(\text{realword}Z - \text{ptPoint}Z)$$ (Equation 5)

In Equation 5, realworldX, realworldY, and realworldZ mean real world coordinates (that is, 3D coordinates), and each of ptPointX, ptPointY, and ptPointZ represents a predetermined one point (for example, $p_1$, $p_2$, or $p_3$) of the floor plane. Accordingly, when all of the pixels of the floor plane are applied to Equation 5, the plane reference distance value d with respect to the floor plane may be 0.

When the plane reference distance value d obtained by Equation 3 or Equation 5 is a predetermined threshold value (for example, 3 cm) or less, the area may be considered as a floor area (floor plane). A depth image according to a height based on the floor area may be generated.

Figure 4:
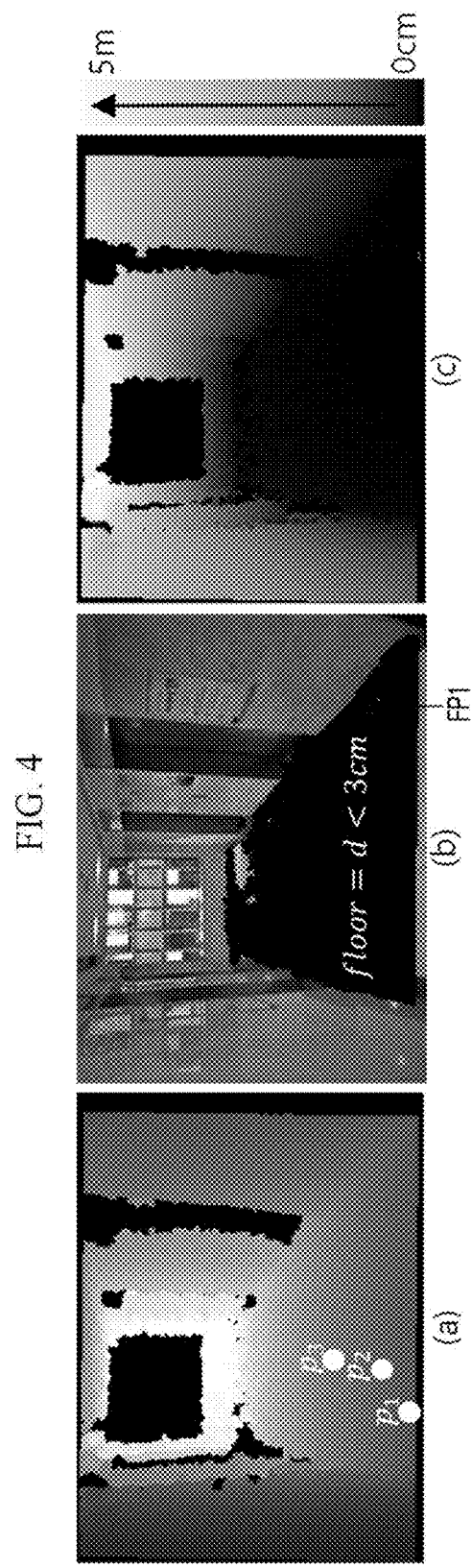
FIG. 4 is a diagram illustrating a floor detecting result according to the exemplary embodiment of the present invention.

FIG. 4 is a diagram illustrating a floor detecting result according to the exemplary embodiment of the present invention.

Particularly, in FIG. 4, (a) represents three points $p_1$, $p_2$, and $p_3$ passing the floor plane, (b) represents a floor plane FP1, in which d<3 cm, detected by the floor detection, and (c) represents a depth image based on a result of the floor detection. In (c), a gray scale image having a height range of 0 cm to 5 m based on the floor plane FP1 is exemplified. In (c), as a coordinate is closer to the floor plane FP1, the image has a darker gray level (lower value).

The background learning unit 104 accumulates height values based on the floor area detected by the floor detecting unit 103 and generate a background model (S104). Particularly, the background learning unit 104 may accumulate an area, in which $Z_{rw}$ is 0, in the area of the image for a predetermined initial time $t_a$ (for example, 10 seconds) as a background model, and then accumulate a height value (based on the floor area) for an area, in which $Z_{rw}$ is not 0, in the area of the image for a predetermined time t (for example, 30 seconds) and average the accumulated values to generate an initial background model. That is, the background learning unit 104 may calculate an average value by accumulating the plane reference distance value d of each pixel calculated by the floor area detecting unit 103 for the predetermined time t, and generate the average value as an initial background model. Herein, the predetermined times to and t are predetermined times after the initial driving of the 3D camera 101a, and may be set by a user.

Figure 5:
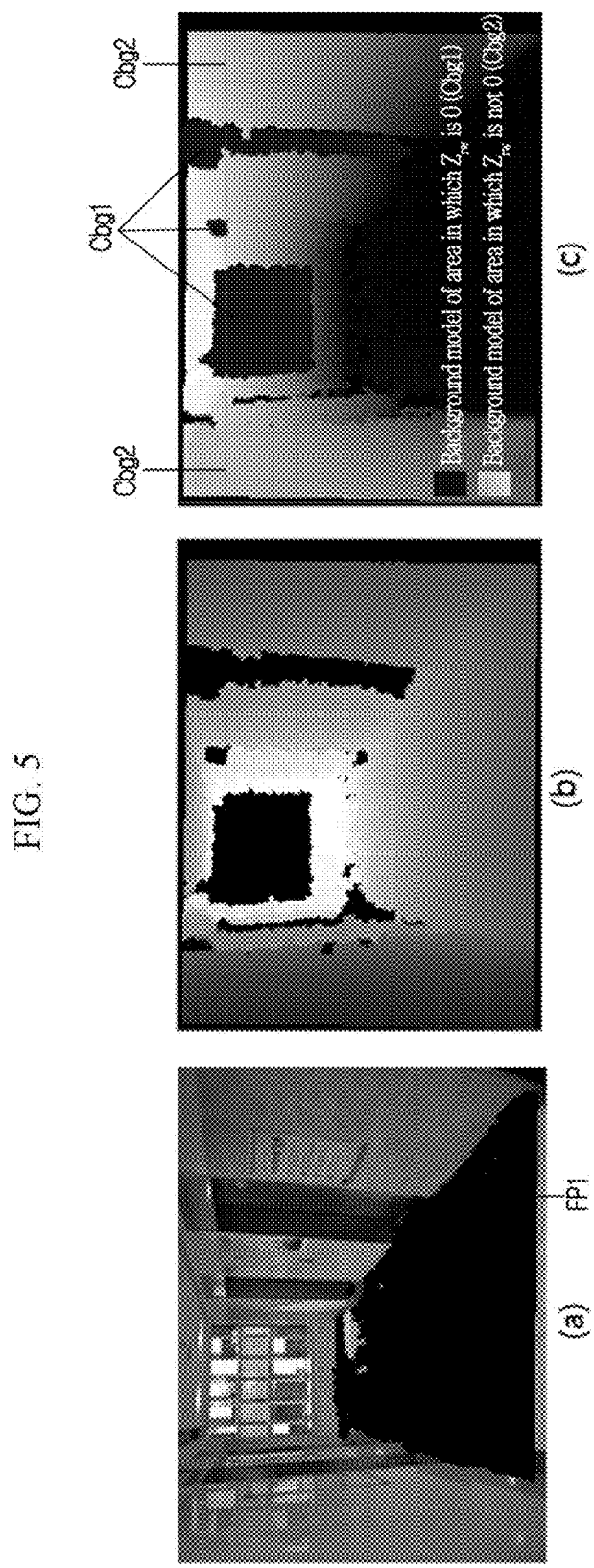
FIG. 5 is a diagram illustrating a background learning result according to the exemplary embodiment of the present invention.

FIG. 5 is a diagram illustrating a background learning result according to the exemplary embodiment of the present invention. Particularly, in FIG. 5, (a) represents the floor area FP1 detected by the floor detecting unit 103, (b) represents a depth image generated by the depth image generating unit 101 and including depth information Z, and (c) represents a background model based on the height image (the plane reference distance value (d) based on the floor area FP1). In (c), Cbg1 represents a background model of the area, in which $Z_{rw}$ is 0, in the area of the image, and Cbg2 represents a background model of the area, in which $Z_{rw}$ is not 0, in the area of the image.

In the meantime, when an object is detected by an object detecting process (comparison between the background model and an input image), which is to be described below, the background learning unit 104 updates the area identified as the background in the area of the image to the background model in real time. Further, when a non-person object (which is an object, not a person) is identified by a person identifying process, which is to be described below, the background learning unit 104 also updates the non-person object to the background model.

Figure 6:
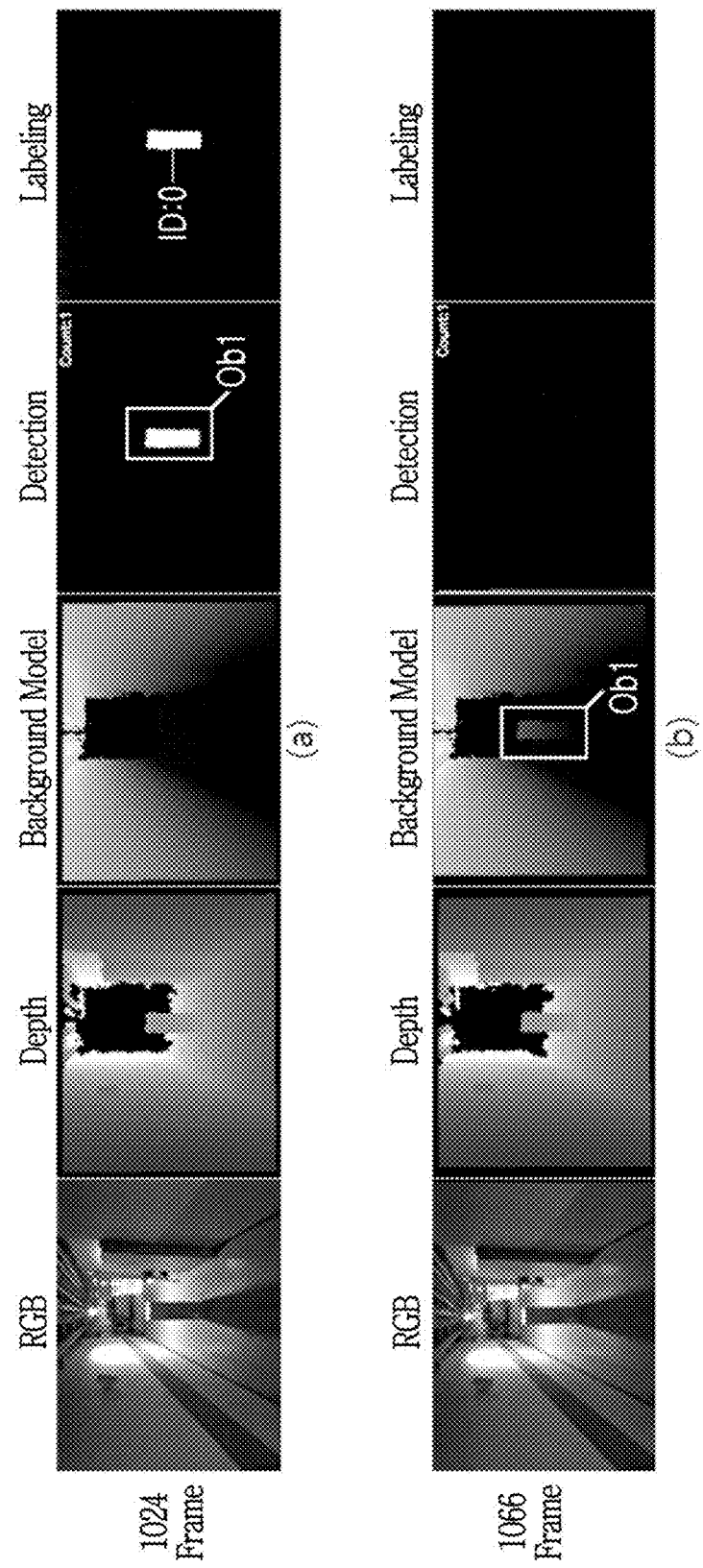
FIG. 6 is a diagram illustrating a background update result according to the exemplary embodiment of the present invention.

FIG. 6 is a diagram illustrating a background update result according to the exemplary embodiment of the present invention. Particularly, in FIG. 6, (a) represents a result (1024 frame) of the identification of a non-person object, and (b) represents a result (1066 frame) of the update of the non-person object to a background model by the background learning unit 104.

In (a) of FIG. 6, the first image represents an input color image, the second image represents a depth image, the third image represents a background model, the fourth image represents a detected object Ob1, and the fifth image represents the object Ob1 to which labelling is applied. When the object Ob1 is identified as a non-person object, the background learning unit 104 updates the object Ob1 to the background model as exemplified in (b) of FIG. 6. In (b) of FIG. 6, the first image represents an input color image, the second image represents a depth image, the third image represents a background model (an object Ob1 is included in the background model), the fourth image represents an object detected image (there is no detected object), and the fifth image represents a labelled image.

The object detecting unit 105 divides a background and a foreground by using the background model generated by the background learning unit 104 (S105). Particularly, the object detecting unit 105 may detect an area, in which a difference between the background model and the floor-based height value (the plane reference distance value d) of the current image is equal to or larger than a threshold value for detection, as a foreground, and detect an area, in which the difference between the background model and the floor-based height value (the plane reference distance value d) of the current image is smaller than the threshold value for detection, as a background. Herein, the background means an immovable area (for example, a floor and a wall surface), and the foreground means an area, in which an object (for example, a person, an animal, and an object) moves.

The threshold value for detection may have a different value according to the floor-based height value and the depth value (distance value) obtained by the 3D camera 101a. That is, the floor-based height value and the depth value (distance value) may be used as weight values for the threshold value for detection. For example, as an area (object) is closer to the floor area and has a smaller distance (depth) to the 3D camera 101a in the area of the image, a smaller threshold value for detection may be applied to the corresponding area (object), and as an area (object) is far from the floor area and has a larger distance (depth) to the 3D camera 101a in the area of the image, a larger threshold value for detection may be applied to the corresponding area (object). When a difference between the background model and the floor-based height value of a specific area is equal to or larger than a threshold value for detection for the corresponding area, the object detecting unit 105 may detect the corresponding area as an object.

The threshold value for detection may be defined by Equation 6 below.

$$\text{Foreground} = D_{floor} > \theta$$

$$\theta = d \times (\text{weight}_y + \text{weight}_z) \quad \text{(Equation 6)}$$

$D_{floor}$=floor−Background Model
$\theta$:threshold
d=2.5 cm
$\text{weight}_y$=floor*0.01
$\text{weight}_z$=$Z_{rw}$*0.01

Equation 6 represents that when $D_{floor}$ is larger than $\theta$, the corresponding area corresponds to a foreground. In Equation 6, $\theta$ represents a threshold value for detection, $D_{floor}$ represents a difference between a floor-based height value (floor) of a current image and the background model, $\text{weight}_y$ represents a weight value based on the floor-based height value (floor), and $\text{weight}_z$ represents a weight value based on a depth value $Z_{rw}$. In Equation 6, it is assumed that d is 2.5 cm, but d may be changed to another value.

As described above, the area detected by the object detecting unit 105 as the background is updated to the background model by the background learning unit 105 in real time.

The object detecting unit 105 removes noise by applying distance-based labelling to the area detected as the foreground, and detects only an object of interest. Herein, the distance-based labelling means that a pixel value of the area detected as the foreground is searched, the area having the adjacent pixel value is determined as the same object, and the same label is allocated to the same object. When a distance between the pixels is smaller than a threshold value by using the information about the adjacent pixel (the pixel value of the object) of the result of the image detection and a 3D real world coordinate value ($X_{rw}$, $Y_{rw}$, $Z_{rw}$) of each pixel, the object detecting unit 105 determines that the corresponding pixel belongs to the same object and allocates the same label to the corresponding pixel, and when the distance between the pixels is equal to or larger than the threshold value, the object detecting unit 105 determines that the corresponding pixel belongs to a different object and allocates a different label to the corresponding pixel.

Figure 7:
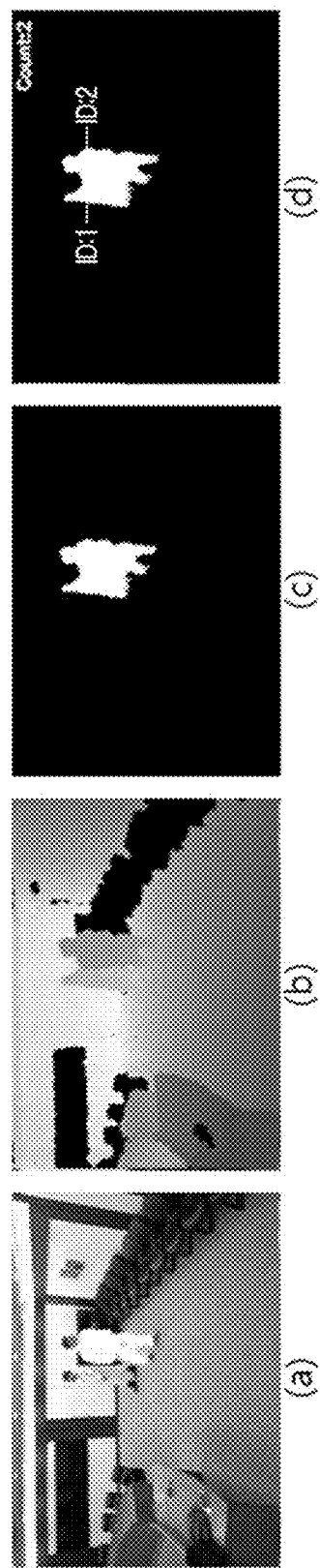
FIG. 7 is a diagram illustrating an object detecting result according to the exemplary embodiment of the present invention.

FIG. 7 is a diagram illustrating an object detecting result according to the exemplary embodiment of the present invention.

In FIG. 7, (a) represents an input 2D color image, (b) represents a 3D depth image generated by the depth image generating unit 101, (c) represents a foreground (object) detected by the object detecting unit 105, and (d) represents an object finally detected by labelling of the object detecting unit 105.

In the case where the labelling is performed based on the 3D real word coordinate value, even though pixels of the two objects are adjacent as illustrate din FIG. 7C, a difference in a distance between the pixels is equal to or larger than a threshold value, so that the object detecting unit 105 determines the two objects as different objects and allocates different labels (for example, ID:1 and ID2) to the different objects, respectively, as illustrated in FIG. 7D. Accordingly, even when two or more people are in contact with each other while having a predetermined distance, the object detecting unit 105 may separately detect each of the two or more people as an individual object.

However, in the case where the labelling based on the 2D image is performed, when pixels of the two objects are adjacent to each other as illustrated in FIG. 7C, the two objects are erroneously determined as the same object and only one same label is allocated to the two objects.

The object feature extracting unit 106 calculates a 3D feature (a size of the object, a speed of the object) of the object labelled by the object detecting unit 105 (S106). Particularly, the object feature extracting unit 106 may extract 2D pixel coordinates and 3D real world coordinates for positions of maximum and minimum pixels of an upper side, a lower side, a left side, a right side, a center point of the object, and $Z_{rw}$ and extract a 3D feature of a predetermined unit (for example, cm) by using the extracted 2D pixel coordinates and 3D real world coordinates.

Figure 8:
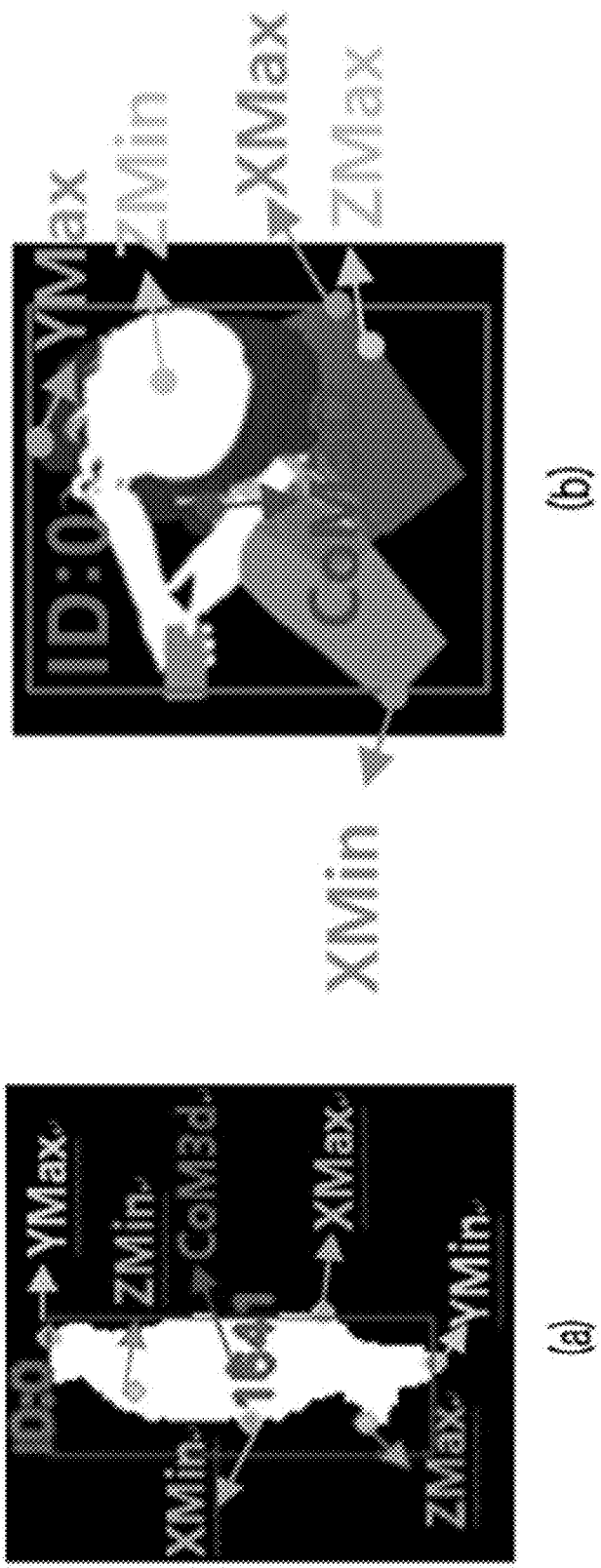
FIG. 8 is a diagram illustrating positions of minimum and maximum pixels of an upper side, a lower side, a left side, a right side, a center point, and a depth (distance) for an object, to which the label is allocated, according to the exemplary embodiment of the present invention.

FIG. 8 is a diagram illustrating positions of minimum and maximum pixels of an upper side, a lower side, a left side, a right side, a center point, and a depth (distance) for an object, to which the label (for example, ID:0) is allocated, according to the exemplary embodiment of the present invention.

In FIG. 8, (a) represents object feature points extracted when the 3D camera 101a is installed on a lateral surface, and (b) represents object feature points extracted when the 3D camera 101a is installed on a ceiling.

In (a) and (b) of FIG. 8, XMin represents a position of a pixel having a minimum value of an X-axis coordinate, and XMax represents a position of a pixel having a maximum value of the X-axis coordinate. In (a) and (b) of FIG. 8, YMin and YMax represent a position of a pixel having a minimum value of a Y-axis coordinate and a position of a pixel having a maximum value of the Y-axis coordinate, respectively, and ZMin and ZMax represent a position of a pixel having a minimum value of a Z-axis coordinate and a position of a pixel having a maximum value of the Z-axis coordinate, respectively. Further, in (a) and (b) of FIG. 8, CoM3d indicates a position of a pixel for the center point of the object. That is, the extracted object feature points are represented in Table 1 below.

TABLE 1

| Feature point | Explanation |
|---|---|
| YMax | One point (i, j) that is the topmost portion in the image coordinate of the detected object |
| YMax$_{rw}$ | One point ($X_{rw}$, $Y_{rw}$, $Z_{rw}$) that is the topmost portion in the real world coordinate of the detected object |
| YMin | One point (i, j) that is the lowermost portion in the image coordinate of the detected object |
| YMin$_{rw}$ | One point ($X_{rw}$, $Y_{rw}$, $Z_{rw}$) that is the lowermost portion in the real world coordinate of the detected object |
| XMax | One point (i, j) that is the rightmost portion in the image coordinate of the detected object |
| XMax$_{rw}$ | One point ($X_{rw}$, $Y_{rw}$, $Z_{rw}$) that is the rightmost portion in the real world coordinate of the detected object |
| XMin | One point (i, j) that is the leftmost portion in the image coordinate of the detected object |
| XMin$_{rw}$ | One point ($X_{rw}$, $Y_{rw}$, $Z_{rw}$) that is the leftmost portion in the real world coordinate of the detected object |
| ZMin | Image coordinate (i, j) of one smallest point in the real world coordinate of the detected object |
| ZMin$_{rw}$ | One smallest point ($X_{rw}$, $Y_{rw}$, $Z_{rw}$) in the real world coordinate of the detected object |
| ZMax | Image coordinate (i, j) of one largest point in the real world coordinate of the detected object |
| ZMax$_{rw}$ | One largest point ($X_{rw}$, $Y_{rw}$, $Z_{rw}$) in the real world coordinate of the detected object |
| CoM2d | Center point of the image coordinate (i, j) of the detected object |
| CoM3d | Center point of the real world coordinate $X_{rw}$, $Y_{rw}$, $Z_{rw}$ of the detected object |

The object feature extracting unit 106 extracts 3D features, such as a height, a width, a thickness, a movement speed, and the like of the object by using the 3D real world coordinate ($X_{rw}$, $Y_{rw}$, $Z_{rw}$) as represented in Table 2 below.

TABLE 2

| 3D feature | Contents |
|---|---|
| 2D size | The number of 2D pixels of the detected object<br>Area(i) = the number of pixels, in which a label is i in the labelled object = n |
| 3D size | A distance weight value is applied to the number n of 2D pixels of the detected object<br>Area(i)z = n × CoM3Dz |
| 2D center point | $CoM2d = \dfrac{Sum2d\,(x_i, y_i)}{n}$<br><br>In the Equation, Sum2d represents an accumulated sum of image horizontal axis coordinates (yi) and image vertical axis coordinates (xi) of the pixel forming the labelled area, and n represents the number of 2D pixels of the detected object. |

TABLE 2-continued

| 3D feature | Contents |
|---|---|
| 3D center point | $\text{CoM3d} = \dfrac{\text{Sum3d}(x_{rw}, y_{rw}, z_{rw})}{n}$ |
| | In the Equation, Sum3d represents an accumulated sum of real world vertical axis coordinates ($x_{rw}$), real word horizontal axis coordinates ($y_{rw}$), and real world depth axis coordinates ($z_{rw}$) of the pixel forming the labelled area, and n represents the number of 2D pixels of the detected object. |
| 3D height | In the case where the 3D camera 101a is installed on a lateral surface |
| | $\text{3D Height} = \begin{cases} (\text{vNormal.x} \times (\text{CoM3d.x} - \text{ptPoint.x})) + \\ (\text{vNormal.y} \times (\text{YMax.y} - \text{ptPoint.y})) + \\ (\text{vNormal.z} \times (\text{CoM3d.z} - \text{ptPoint.z})) \end{cases}$ |
| | In the case where the 3D camera 101a is installed on a lateral surface, 3D Height represents a height from a floor to a topmost point of the object. |
| | In the case where the 3D camera 101a is installed on a ceiling |
| | $\text{3D Height} = \begin{cases} (\text{vNormal.x} \times (\text{ZMin.x} - \text{ptPoint.x})) + \\ (\text{vNormal.y} \times (\text{ZMin.y} - \text{ptPoint.y})) + \\ (\text{vNormal.z} \times (\text{ZMin.z} - \text{ptPoint.z})) \end{cases}$ |
| | In the Equation, each of vNormal.x, y, and z represents a coordinate of normal (a, b, and c of Equation 4) of the floor, each of ptPoint.x, y, and z represents a coordinate of one point of the floor, each of CoM3d.x, y, and z represents a coordinate of a 3D center point, each of ZMin.x, y, and z represents a coordinate of a pixel having a minimum value in the Z-axis, and YMax.y represents the topmost point of the object. |
| 3D width | 3D Width = $\text{XMax}_{rw} - \text{XMin}_{rw}$ |
| 3D thickness | 3D Depth = $\text{ZMax}_{rw} - \text{ZMin}_{rw}$ |
| 2D height | 2D Height = $\text{YMax}_y - \text{YMin}_y$ |
| 2D width | 2D Width = $\text{XMax}_x - \text{XMin}_x$ |
| Movement speed | $\text{Speed} = \sqrt{\text{Speed}_x^2 + \text{Speed}_z^2}$ |
| | $*\text{Speed}_x: |\text{CoM3d}_{x(t)} - \text{CoM3d}_{x(t-1)}| * (0.001 * \text{FPS})$ |
| | $*\text{Speed}_z: |\text{CoM3d}_{z(t)} - \text{CoM3d}_{z(t-1)}| * (0.001 * \text{FPS})$ |
| | In the Equation, $\text{CoM3d}_{x(t)}$ and $\text{CoM3d}_{z(t)}$ represent center points x and z of a current frame, respectively, $\text{CoM3d}_{x(t-1)}$ and $\text{CoM3d}_{z(t-1)}$ represents center points x and z of one previous frame, and FPS indicates the number of frames processed per second. |

The object tracking unit 107 tracks the object feature extracted by the object feature extracting unit 106 in real time (S107). Particularly, the object tracking unit 107 may track a movement of the object by using the result of the extraction of the object feature and allocate the same ID to the corresponding object. That is, the object tracking unit 107 may calculate an Euclidean distance by using the feature points (for example, YMax.xrw, YMax.yrw, YMax.zrw, YMin.xrw, YMin.yrw, YMin.zrw, CoM2d.x, CoM2d.y, CoM3d.x, CoM3d.y, CoM3d.z, and speed) of the object detected in the previous frame and the feature points (for example, YMax.xrw, YMax.yrw, YMax.zrw, YMin.xrw, YMin.yrw, YMin.zrw, CoM2d.x, CoM2d.y, CoM3d.x, CoM3d.y, CoM3d.z, and speed) of the object detected in the current frame. Further, when the calculate Euclidean distance value is within a threshold value, the object tracking unit 107 may determine that the object of the previous frame and the object of the current frame are the same object, and allocate the ID, which has been allocated to the corresponding object in the previous frame, to the corresponding object in the current frame.

The identifying unit 108 identifies whether the object tracked by the object tracking unit 107 is the object (for example, a person object) in a target type through 3D head model matching (S108). Particularly, the identifying unit 108 may determine whether a head of a person exists in the tracked object and identify whether the corresponding object is a person. When it is identified that the object is a person, a recognition feature of the corresponding feature is calculated, and when it is not identified that the object is a person, the corresponding object is updated to the background model.

Figure 9A:
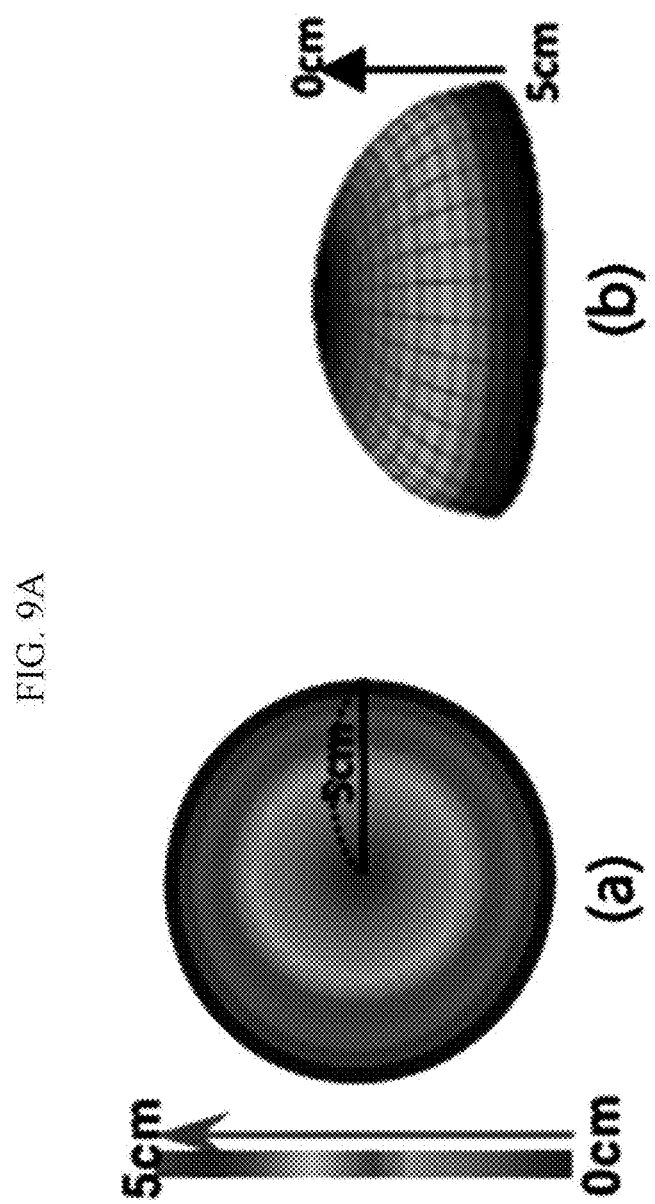
Figure 9C:
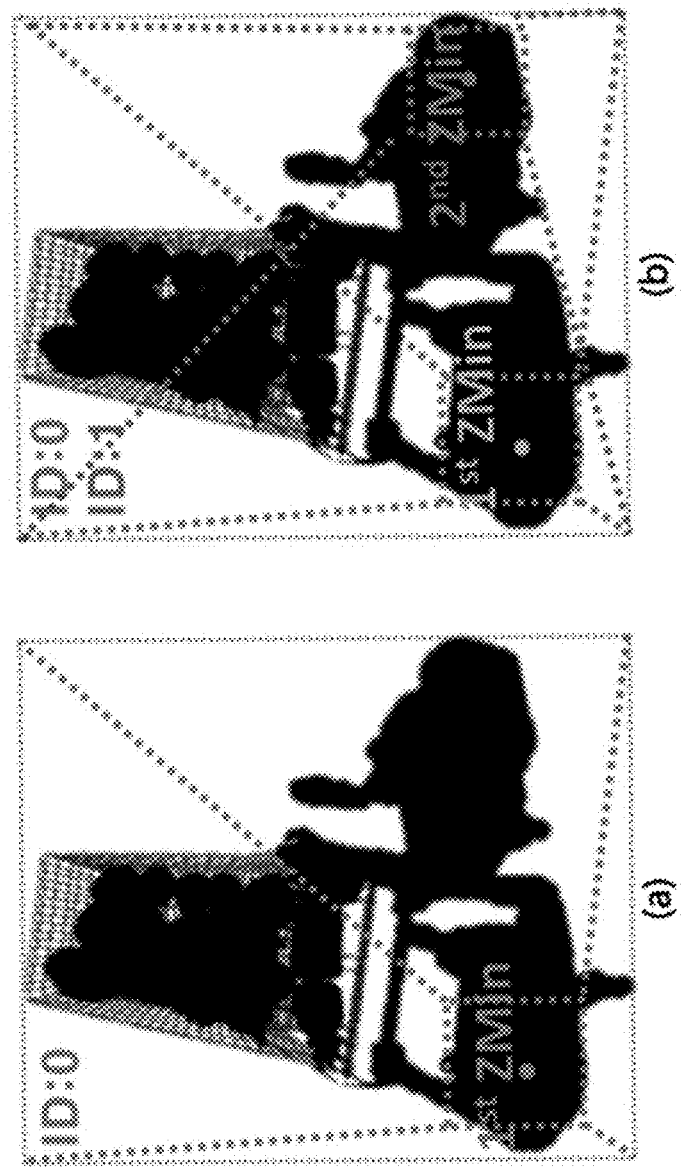
Figure 10A:
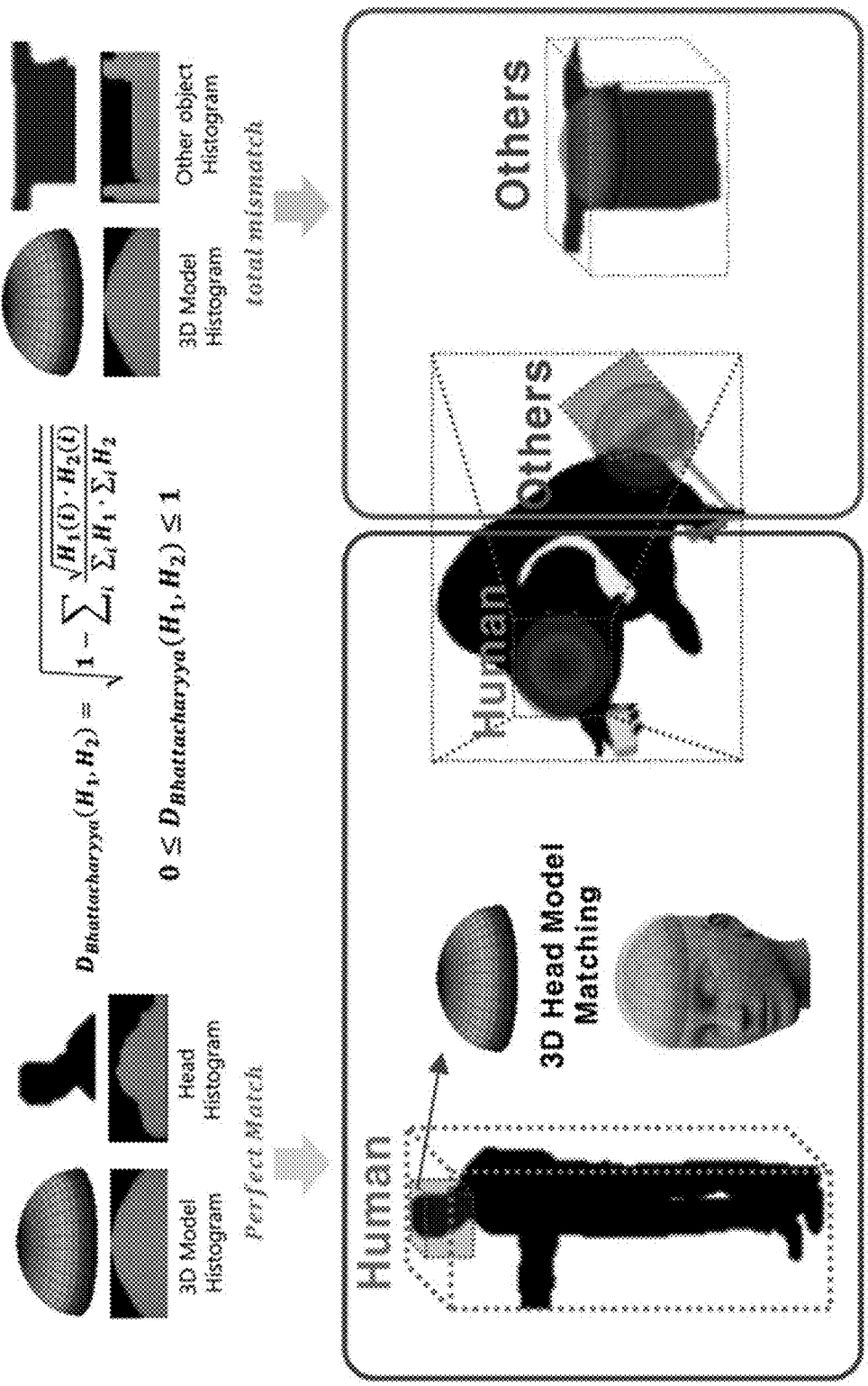
FIG. 10A is a diagram illustrating a matching score calculating process in the person identifying process according to the exemplary embodiment of the present invention.

The person identifying process of the identifying unit 108 includes a head model generating process, a head candidate area designating process, and a matching score calculating process. FIGS. 9A, 9B, and 9C are diagrams illustrating a head model generating process and a head candidate area designating process in the person identifying process according to the exemplary embodiment of the present invention, and FIG. 10A is a diagram illustrating a matching score calculating process in the person identifying process according to the exemplary embodiment of the present invention.

Particularly, the identifying unit 108 may generate a circle, of which a center has a depth (distance) of 0 cm, and an outer side has a depth (distance) of 5 cm, as a 3D head model as exemplified in FIG. 9A. That is, a cross-section of the 3D head model having a predetermined depth is a circle. FIG. 9A illustrates a 3D head model having a depth range (distance range) of 0 cm to 5 cm as an example. In FIG. 9A, (a) represents a top view of the 3D head model, and (b) represents a side view of the 3D head model.

The identifying unit 108 may generate the 3D head model, and then designate a head candidate area as exemplified in FIG. 9B. In FIG. 9B, (a) represents the case where the 3D camera 101a is installed on a ceiling, and (b) represents the case where the 3D camera 101a is installed on a lateral surface (wall surface).

The identifying unit 108 may designate a circle area having a predetermined radius based on a pixel having a minimum depth value (the case where the 3D camera 101a is installed on the ceiling) based on the 3D camera 101a among the pixels of the object or the pixel having a maximum height value based on a floor area (the case where the 3D camera 101a is installed on the lateral surface) as a head candidate area. That is, the identifying unit 108 may designate a circle area having a radius of 5 cm based on tracked ZMin (the case where the 3D camera 101a is installed on the ceiling, for example, (a) of FIG. 9B) of the object or tracked YMax (the case where the 3D camera 101a is installed on the lateral surface, for example, (b) of FIG. 9B) of the object as a head candidate area.

In the meantime, the identifying unit 108 may consider the case where several objects overlap as exemplified in FIG. 9C. FIG. 9C illustrates the case where the 3D camera 101a is installed on a ceiling as an example, and particularly, in FIG. 9C, (a) represents the first head candidate area and (b) represents the first head candidate area and the second head candidate area. The second head candidate area corresponds to an object, to which the label (ID:1) is allocated.

Particularly, the identifying unit 108 may designate the first head candidate area by using ZMin ($1^{st}$ ZMin) of the object as exemplified in (a) of FIG. 9C. Herein, the first head candidate area corresponds to the object, to which the label (ID:0) is allocated. Further, when a ratio of the pixels of the first head candidate area to the total number of pixels of the object (for example, including the number of pixels of the left object, the number of pixels of the right object, and the number of pixels of a cart in (b) of FIG. 9C) is a predetermined ratio or less, the identifying unit 108 may re-extract ZMin (2nd ZMin) or YMax for the remaining area (for example, including the remaining area except for the first head candidate area in the area of the left object, the right object, and the cart in (b) of FIG. 9C) except for the first head candidate area and designate the second head candidate area as exemplified in (b) of FIG. 9C. The identifying unit 108 may repeat the foregoing process until the number of pixels of the remaining area except for the head candidate area (for example, the remaining are except for the first head candidate area in the area of the left object, the remaining are except for the second head candidate area in the area of the right object, and the cart in (b) of FIG. 9C) is a threshold value or less, and designate several head candidate areas.

The identifying unit 108 may calculate a matching score as exemplified in FIG. 10A. Particularly, the identifying unit 108 may calculate a matching score between the 3D head model and the head candidate area and identify a person object and a non-person object. As described above, the non-person object is updated to the background model.

In order to calculate a matching score, the identifying unit 108 may generate a histogram by applying histogram projection based on the depth value to the 3D head model and the head candidate area, and calculate a Bhattacharyya distance of Equation 7 below by using the histogram.

$$D_{Bhattacharyya}(H_1, H_2) = \sqrt{1 - \sum_i \frac{\sqrt{H_1(i) \cdot H_2(i)}}{\sum_i H_1(i) \cdot \sum_i H_2(i)}}$$ (Equation 7)

$$0 \le D_{Bhattacharyya}(H_1, H_2) \le 1$$

In Equation 7, $H_1(i)$ and $H_2(i)$ represent a histogram (or a template histogram) of the 3D head model and a histogram (or a head candidate histogram) of the head candidate area, respectively.

Further, when the calculated Bhattacharyya distance is close to 0 (a threshold value or less), the identifying unit 108 may identify the object having the corresponding head candidate area as a person, and calculate a recognition feature of the corresponding object.

FIG. 10B is a diagram illustrating a 3D head model matching result according to the exemplary embodiment of the present invention. In FIG. 10B, (a) represents a top view head model matching result, and (b) represents a side view head model matching result.

The recognition feature calculating unit 109 calculates a recognition feature (for example, a feature for counting a mover, detecting crowding, and detecting a remaining person) for the person object identified by the identifying unit 108 (S109).

Particularly, the recognition feature calculating unit 109 may count a mover. Herein, the mover counting means a measurement of the number of people moving in one way or two ways. When the number of movers is recognized, crowd density based on a time zone of a specific space may be analyzed, and the analyzed crowd density may be utilized for marketing. Further, when the number of movers is recognized, remaining people staying in the specific space for a long time may be detected, and the detected remaining people may be utilized for detecting and preventing an accident. The recognition feature calculating unit 109 may set a count line at a position, at which the mover may be counted within a detection space (detection area), and when a head center point of the person object passes the count line, the recognition feature calculating unit 109 may count the passing object.

Figure 11A:
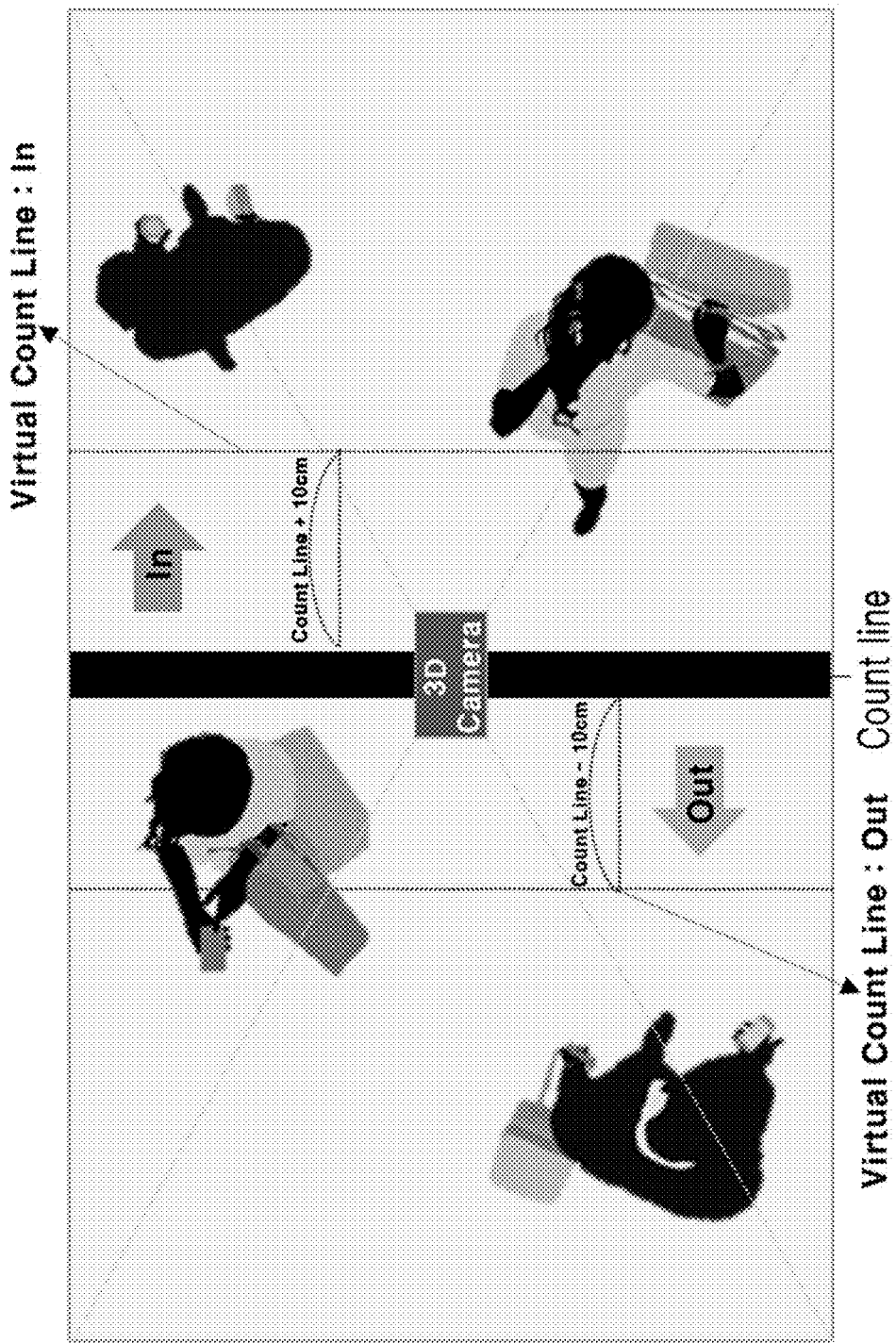
FIG. 11A is a diagram illustrating setting of a count line when a 3D camera 101a is installed on a ceiling according to the exemplary embodiment of the present invention.

FIG. 11A is a diagram illustrating setting of a count line when the 3D camera 101a is installed on a ceiling according to the exemplary embodiment of the present invention.

The recognition feature calculating unit 109 may set one or more count lines. When the count line is set, the recognition feature calculating unit 109 may automatically set a virtual count line at positions ±10 cm before and after the count line as exemplified in FIG. 11a.

When the head center point of the person object passes both the count line and the virtual count line, the recognition feature calculating unit 109 may count an in-object (for example, an entering person) or an out-person (for example, a leaving person) according to a passing direction. For example, when the head center of the person object sequentially passes the count line and the front virtual count line, the recognition feature calculating unit 109 counts the number of entering people, and when the head center of the person object sequentially passes the count line and the rear virtual count line, the recognition feature calculating unit 109 may count the number of leaving people. The recognition feature calculating unit 109 may make a notification for the number of movers.

The recognition feature calculating unit 109 may calculate crowd density. Particularly, the recognition feature calculating unit 109 may calculate crowd density based on the floor detecting result by using an extent of the floor of the detection area, and a width, a thickness, and a height of the person object.

Figure 11B:
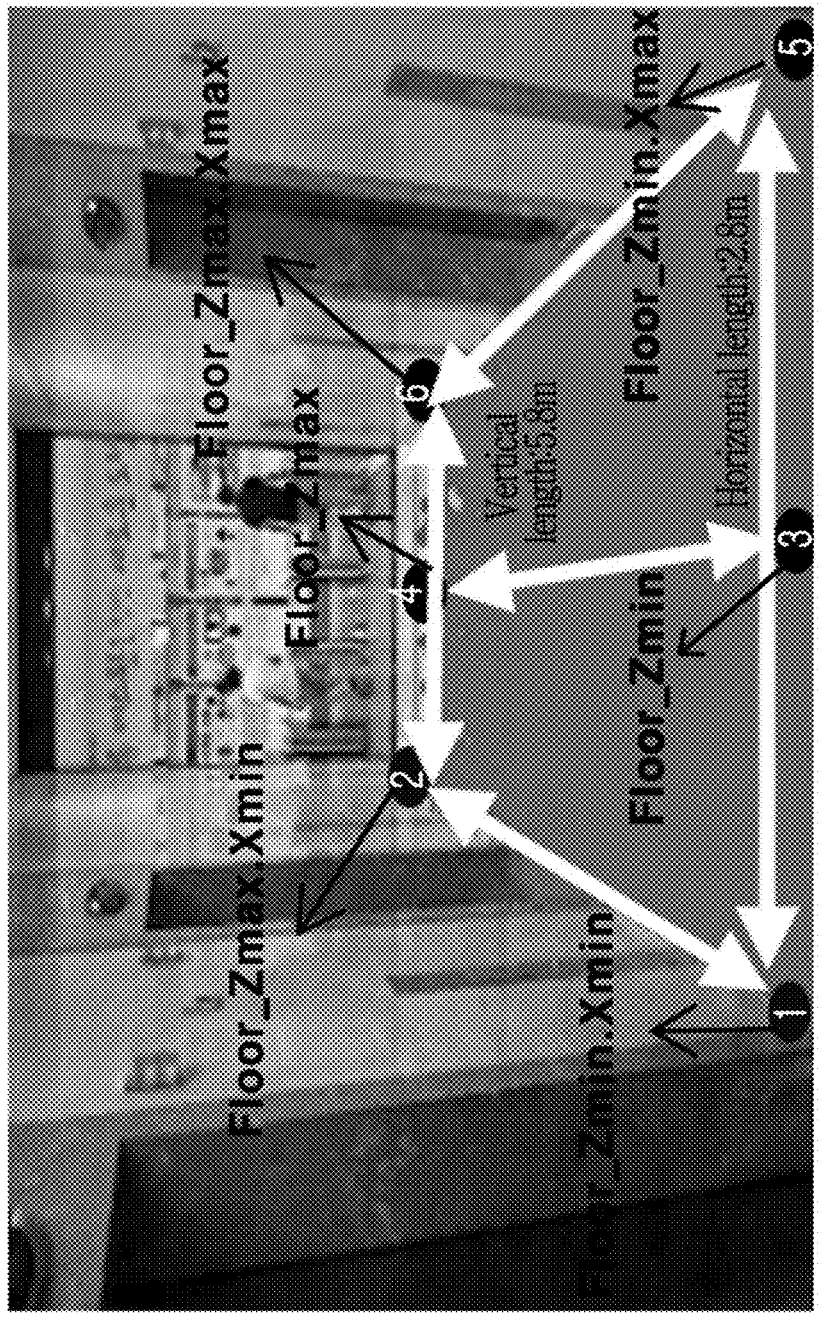
FIG. 11B is a diagram illustrating a method of extracting a feature for calculating an extent of a floor according to an exemplary embodiment of the present invention.

FIG. 11B is a diagram illustrating a method of extracting a feature for calculating an extent of a floor according to an exemplary embodiment of the present invention.

In order to calculate an extent of a floor, the recognition feature calculating unit 109 may find Floor_Zmin that is the closest to the 3D camera 101a and Floor_Zmax that is the farthest from the 3D camera 101a within the area (for example, a floor in which d<3 cm) detected as the floor. Further, the recognition feature calculating unit 109 may find one leftmost point (Floor_Zmin.Xmin, Floor_Zmax.Xmin) and one rightmost point (Floor_Zmin.Xmax, Floor_Zmax.Xmax) based on each of Floor_Zmin and Floor_Zmax. That is, the recognition feature calculating unit 109 may calculate the leftmost point Floor_Zmin.Xmin and the rightmost point Floor_Zmin.Xmax among the points corresponding to Floor_Zmin, and calculate the leftmost point Floor_Zmax.Xmin and the rightmost point Floor_Zmax.Xmax among the points corresponding to Floor_Zmax.

Then, the recognition feature calculating unit 109 may calculate a horizontal length and a vertical length of the detection area (or the floor area) by using the one leftmost point (Floor_Zmin.Xmin, Floor_Zmax.Xmin) and the one rightmost point (Floor_Zmin.Xmax, Floor_Zmax.Xmax). Further, the recognition feature calculating unit 109 may calculate an extent of the floor area by using the horizontal length and the vertical length of the detection area (or the floor area). FIG. 11B illustrates the case where the horizontal length of the floor area is 2.8 m, and the vertical length of the floor area is 5.8 m as an example.

The recognition feature calculating unit 109 may calculate crowd density defined as Equation 8 below by using an extent of a floor area, and a width, a thickness, and a height of a person object.

$$\text{Crowd density} = \left(\frac{\text{Head Width} \times \text{Head Depth}}{\text{Floor Area}}\right) \times 100 \quad \text{(Equation 8)}$$

In Equation 8, Floor area represents an extent of a floor of the detection area, Head width represents head widths of the entire person objects existing within the detection area, and Head Depth represents head thicknesses or head heights of the entire person objects existing within the detection area. Further, the recognition feature calculating unit 109 may determine a crowding situation according to the crowd density. For example, when the crowd density is a threshold value or more, the recognition feature calculating unit 109 may detect crowd forming. When the recognition feature calculating unit 109 detects the crowding situation, the recognition feature calculating unit 109 may make a notification.

The recognition feature calculating unit 109 may measure a staying time.

FIG. 11C is a diagram illustrating a remaining person detection method according to an exemplary embodiment of the present invention.

The recognition feature calculating unit 109 may check the number of entering people and the number of leaving people by using the mover count information. When the number of entering people is not the same as the number of leaving people, the recognition feature calculating unit 109 may determine that a remaining person exists. The number of remaining people is obtained by subtracting the number of leaving people from the number of entering people. FIG. 11C illustrates the case where the number of entering people is 10, the number of leaving people is 9, and the number of remaining people is 1 as an example. The recognition feature calculating unit 109 may accumulate a staying time of the remaining people. When the staying time is equal to or larger than a predetermined threshold value, the recognition feature calculating unit 109 may make a notification.

The processor 120 may be configured to implement a procedure, a function, and methods related to the detection device 100 in the present specification. Further, the processor 120 may control each configuration of the detection device 100.

The memory 121 is connected with the processor 120, and stores various information related to the operation of the processor 120.

In the foregoing, the method of counting, by the detection device 100, the movers by using the 3D camera 101*a* and detecting abnormal situation (for example, a remaining person and crowding) based on the mover count information has been described. A detection method according to an exemplary embodiment of the present invention will be organized with reference to FIGS. 12A to 12F.

The detection device 100 obtains depth information from the 3D camera 101*a* installed on a ceiling or a wall surface, detects an object by using the depth information, and identifies only a person among the detected objects through 3D head model matching. Further, the detection device 100 measures congestion density within the detection space.

Figure 12A:
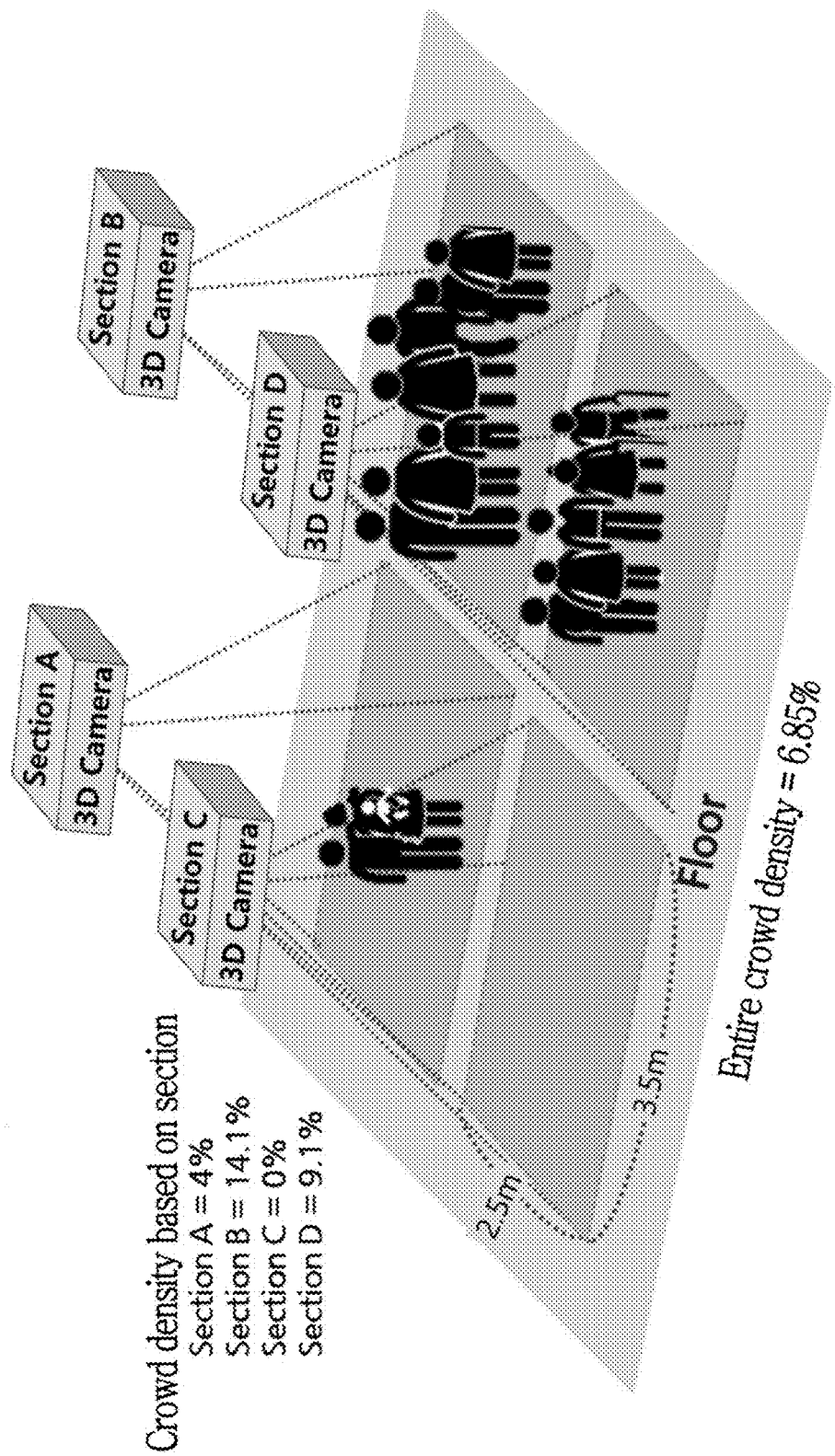
FIG. 12A is a diagram illustrating a method of measuring crowd density when a 3D camera is installed on a ceiling according to the exemplary embodiment of the present invention.
Figure 12B:
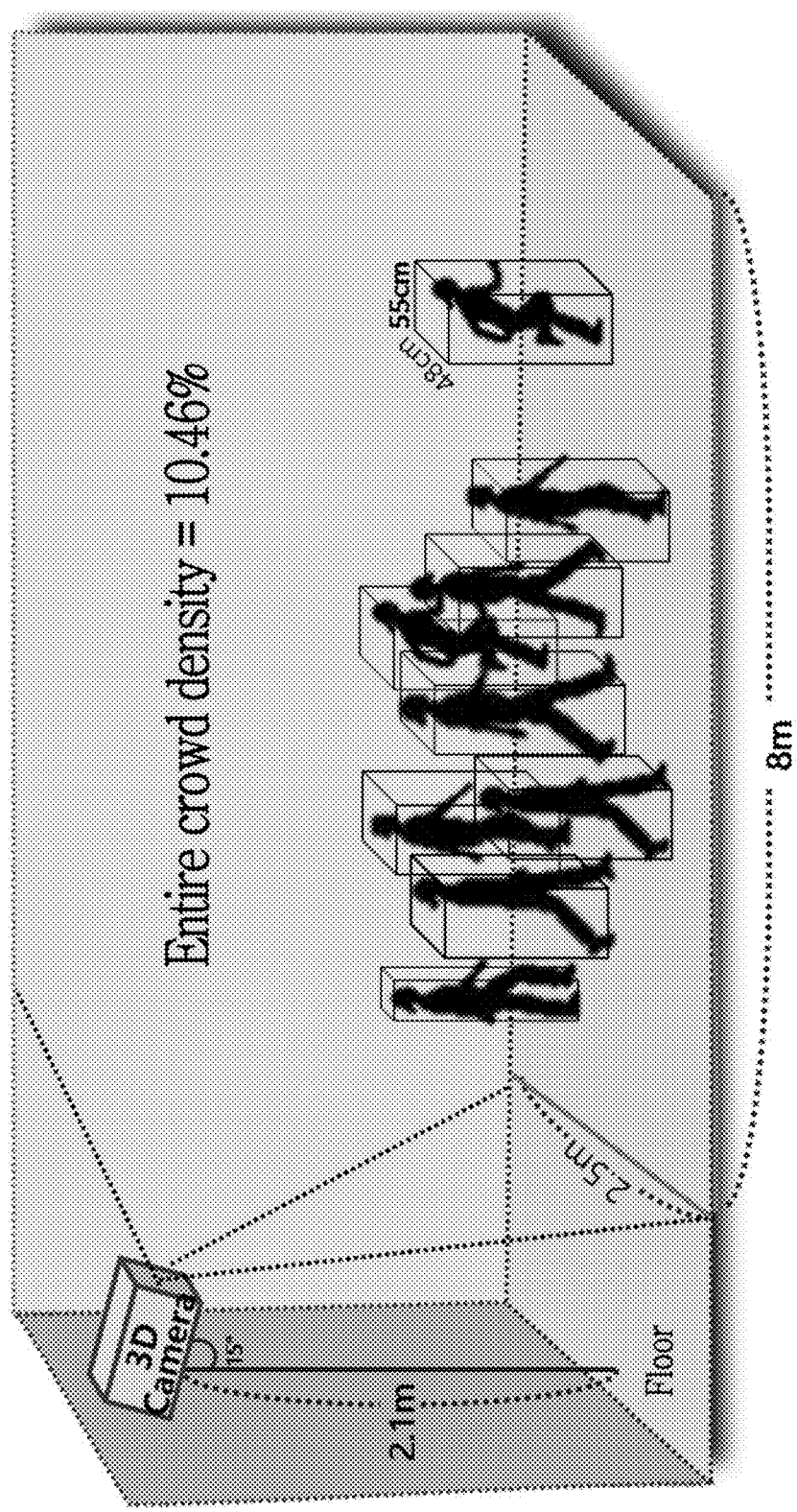
FIG. 12B is a diagram illustrating a method of measuring crowd density when a 3D camera is installed on a wall surface according to the exemplary embodiment of the present invention.

The detection device 100 may measure crowd density based on a section (Section A, Section B, Section C, and Section D) and the entire crowd density as exemplified in FIGS. 12A and 12B, and detect a crowding situation by using the crowd density.

FIG. 12A is a diagram illustrating a method of measuring crowd density when the 3D camera 101*a* is installed on a ceiling according to the exemplary embodiment of the present invention, and FIG. 12B is a diagram illustrating a method of measuring crowd density when the 3D camera 101*a* is installed on a lateral surface (wall surface) according to the exemplary embodiment of the present invention. FIG. 12A illustrates the case where each section is as 2.5 m×3.5 m an example. 12B illustrates the case where the 3D camera 101*a* is installed 2.1 m high from a floor with 15° as an example.

Figure 12C:
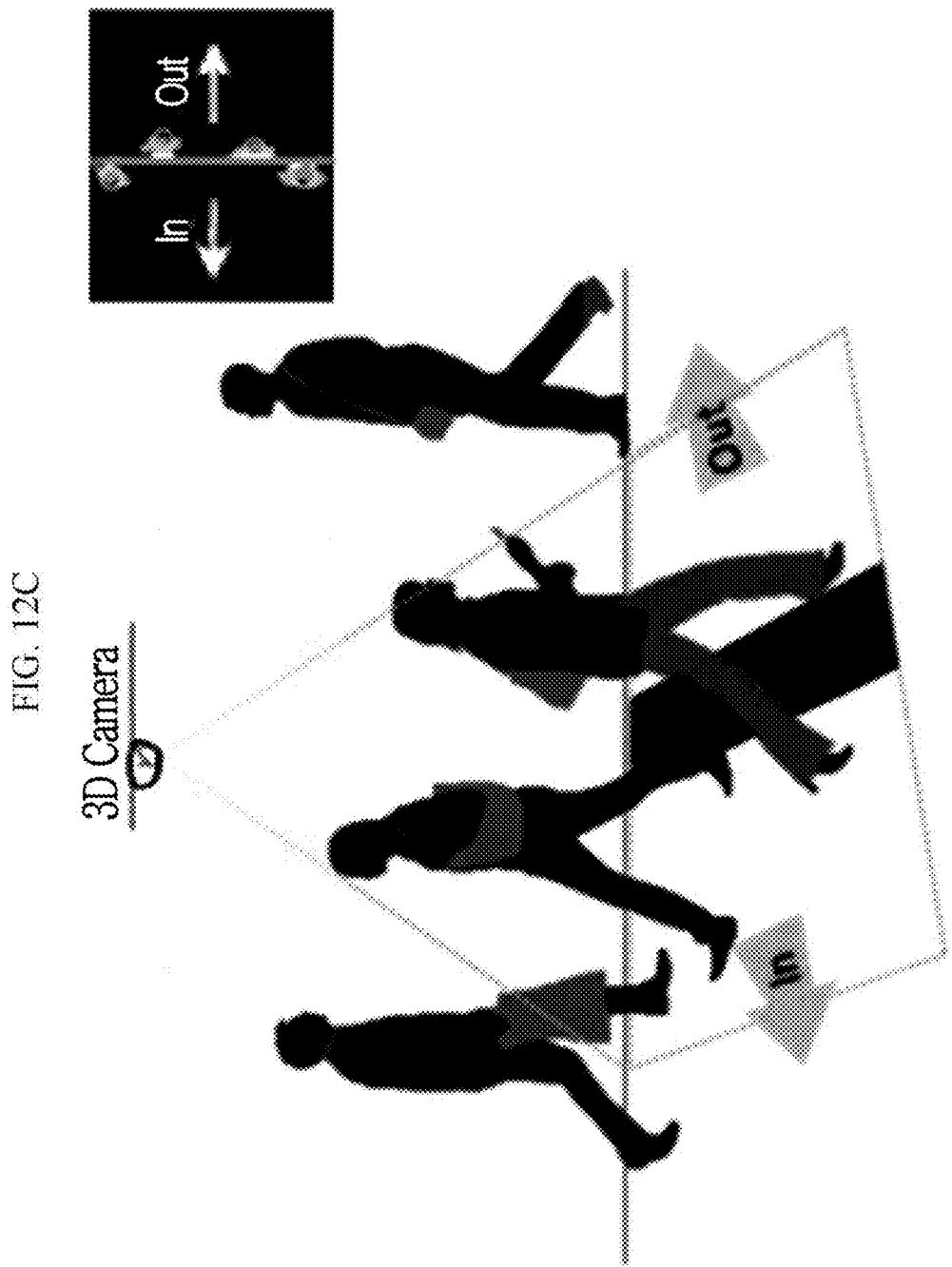
FIG. 12C is a diagram illustrating a method of counting a mover when a 3D camera is installed on a ceiling according to the exemplary embodiment of the present invention.
Figure 12D:
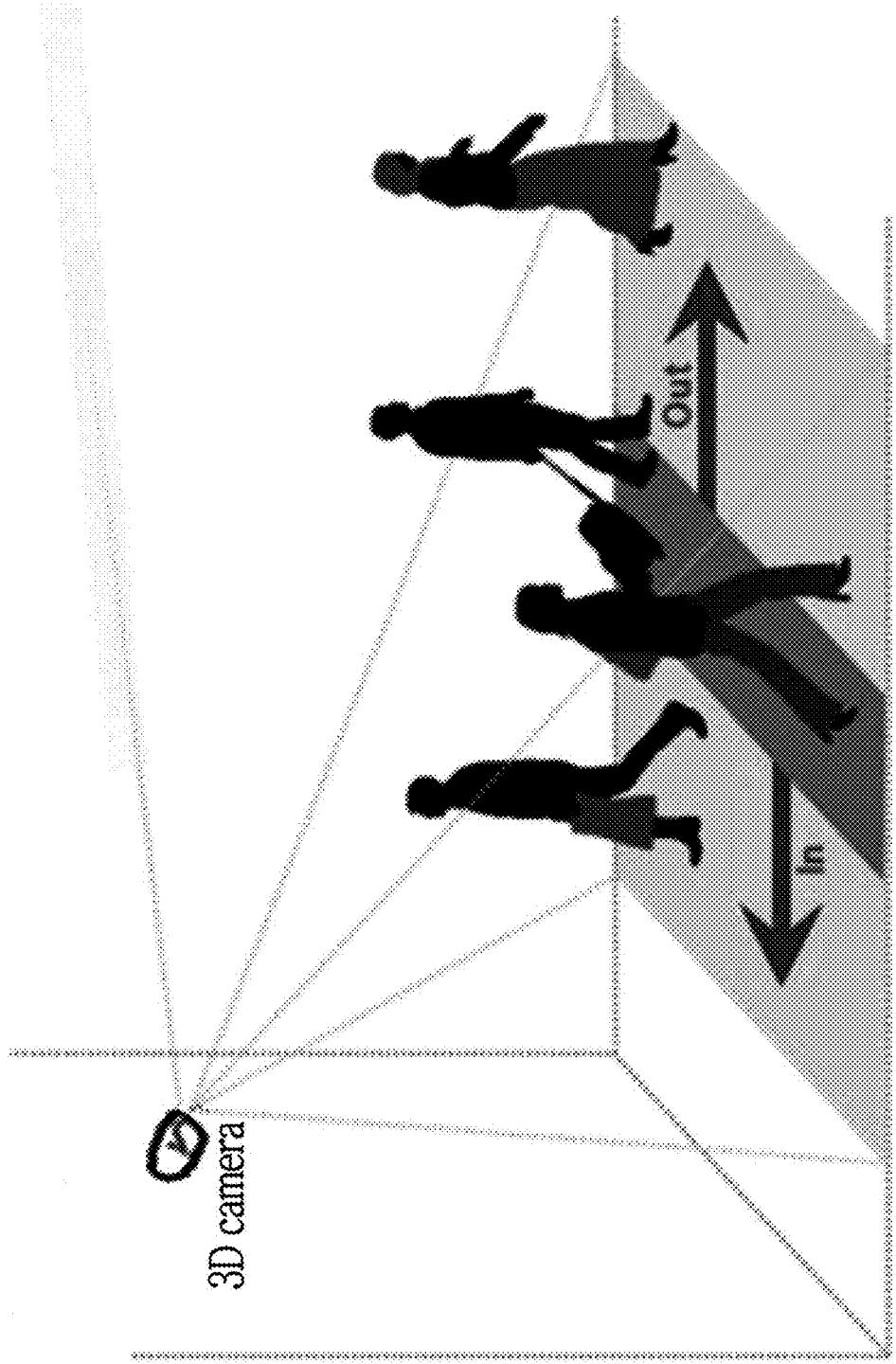
FIG. 12D is a diagram illustrating a method of counting a mover when a 3D camera is installed on a wall surface according to the exemplary embodiment of the present invention.

Further, the detection device 100 may count a mover passing count lines as exemplified in FIGS. 12C and 12D.

FIG. 12C is a diagram illustrating a method of counting a mover when the 3D camera 101*a* is installed on a ceiling according to the exemplary embodiment of the present invention, and FIG. 12D is a diagram illustrating a method of counting a mover when the 3D camera 101*a* is installed on a lateral surface (wall surface) according to the exemplary embodiment of the present invention.

Figure 12E:
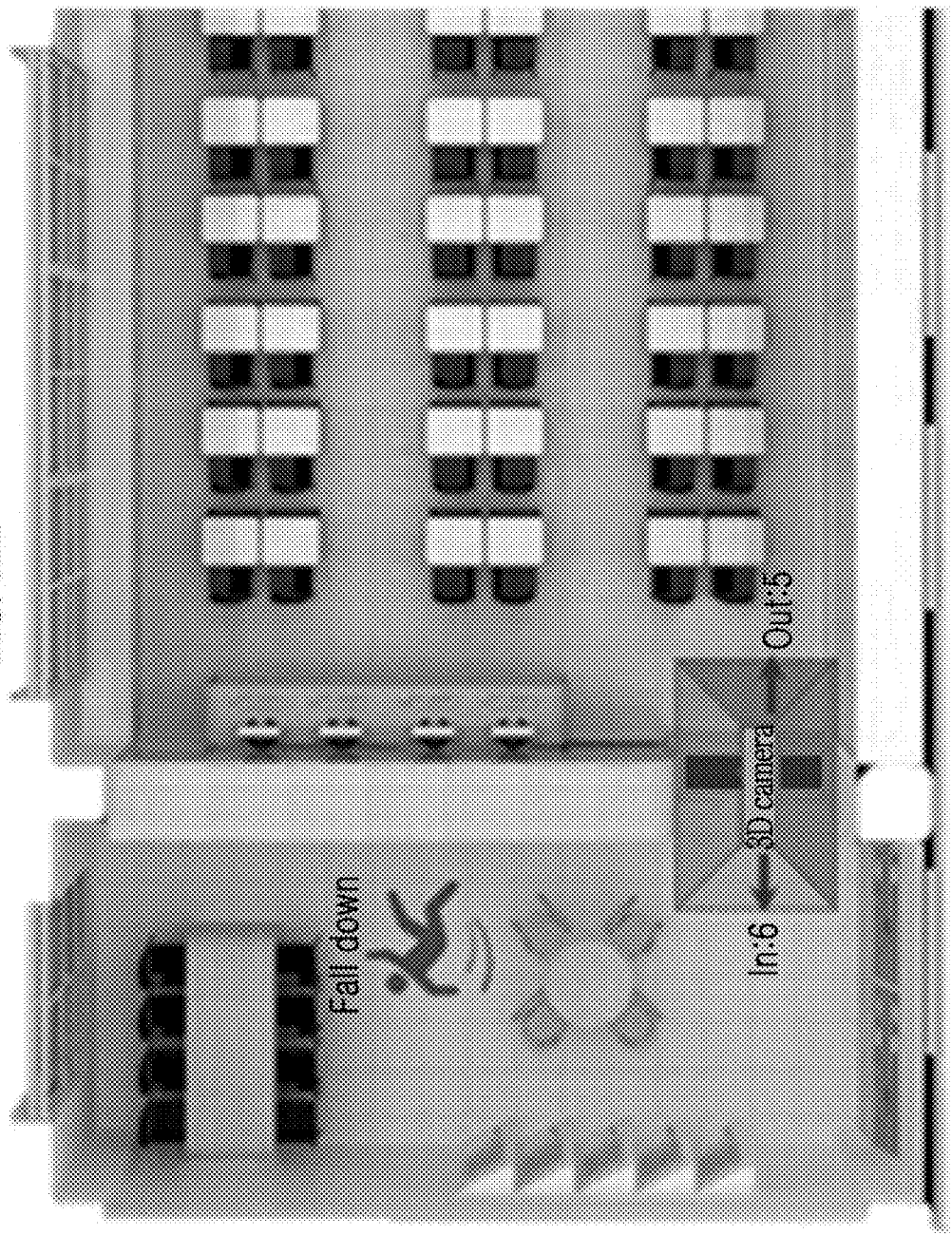
FIG. 12E is a diagram illustrating a method of detecting a remaining person when a 3D camera is installed on a ceiling according to the exemplary embodiment of the present invention.
Figure 12F:
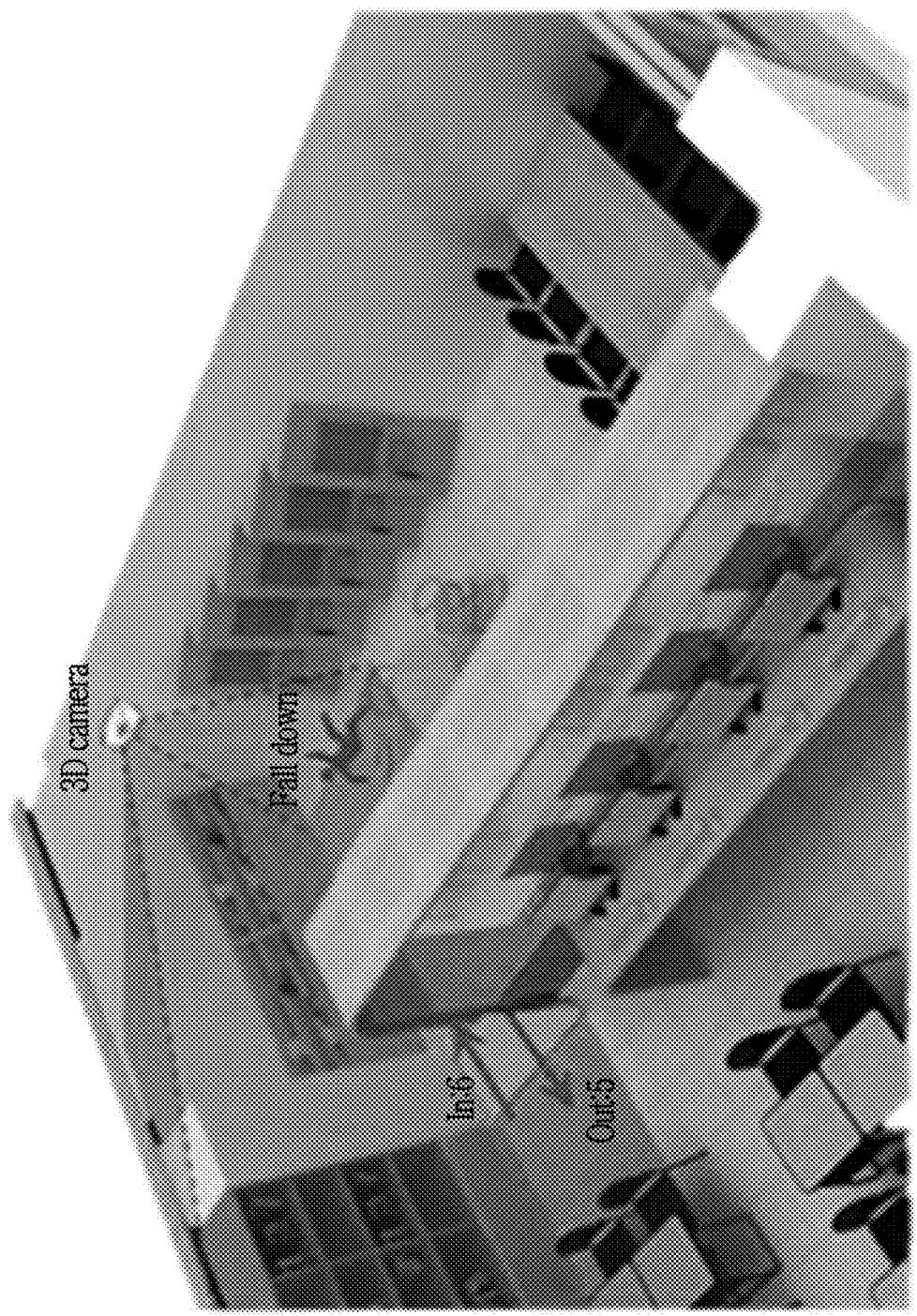
FIG. 12F is a diagram illustrating a method of detecting a remaining person when a 3D camera is installed on a wall surface according to the exemplary embodiment of the present invention.

Then, the detection device 100 may detect a remaining person of a specific space based on the number of entering and leaving movers as exemplified in FIGS. 12E and 12F and detect an abnormal situation through the detection of the remaining person.

FIG. 12E is a diagram illustrating a method of detecting a remaining person when the 3D camera 101*a* is installed on a ceiling according to the exemplary embodiment of the present invention, and FIG. 12F is a diagram illustrating a method of detecting a remaining person when the 3D camera 101*a* is installed on a lateral surface (wall surface) according to the exemplary embodiment of the present invention. FIGS. 12E and 12F illustrate the case where the number of entering people is 6, the number of leaving people is 5, and the number of remaining people is 1 as an example.

In the meantime, the exemplary embodiment of the present invention is not implemented only by the foregoing device and/or method, and may also be implemented by a program executing a function corresponding to the configuration of the exemplary embodiment of the present invention or a recording medium, in which the program is recorded, and the implementation may be easily carried out by those skilled in the art based on the description of the exemplary embodiment.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

The invention claimed is:

1. A detection method of a detection device, the detection method comprising:
    detecting at least one object in a frame by using depth information about the frame obtained by a camera;
    identifying whether said at least one object is a person through three-dimensional (3D) head model matching, which matches a head candidate area of said at least one object with a 3D head model; and calculating a feature for detection of a situation by using said at least one object when it is identified that said at least one object is the person, wherein calculating the feature for detection of the situation includes:
- tracking the at least one object in subsequent frames; and
- incrementing a number of movers in a first direction if a center point of said at least one subject passes a count line and a first virtual count line.

2. The detection method of claim 1, wherein the step of identifying includes:
- designating a circle area, which is based on at least one of a first pixel having a minimum depth value based on the camera among pixels of said at least one object and a second pixel having a maximum height value based on a floor area of the frame, and has a predetermined radius, as a first head candidate area.

3. The detection method of claim 2, wherein the step of identifying further includes:
- when a radio of the number of pixels of the first head candidate area to the number of entire pixels of said at least one object is a first threshold value or less, calculating a remaining area except for the first head candidate area in an area of said at least one object;
- extracting at least one of a third pixel having a minimum depth value based on the camera among pixels of the remaining area and a fourth pixel having a maximum height value based on the floor area; and
- designating a circle area, which is based on at least one of the third pixel and the fourth pixel and has a predetermined radius, as a second head candidate area.

4. The detection method of claim 2, wherein the step of identifying further includes:
- generating the 3D head model having a predetermined depth; and
- calculating a Bhattacharyya distance between the first head candidate area and the 3D head model.

5. The detection method of claim 4, wherein the step of calculating the Bhattacharyya distance includes:
- generating a first histogram and a second histogram by applying depth-based histogram projection to the first head candidate area and the 3D head model; and
- calculating the Bhattacharyya distance by using the first histogram and the second histogram.

6. The detection method of claim 5, wherein the step of calculating of the Bhattacharyya distance by using the first histogram and the second histogram includes calculating the Bhattacharyya distance by using Equation 1 below.

$$D_B(H_1, H_2) = \sqrt{1 - \sum_i \frac{\sqrt{H_1(i) \cdot H_2(i)}}{\sum_i H_1(i) \cdot \sum_i H_2(i)}}$$ [Equation 1]

($D_B$: Bhattacharyya distance, $H_1(i)$: first histogram, $H_2(i)$: second histogram)

7. The detection method of claim 4, wherein the step of identifying further includes identifying an object including the first head candidate area among said at least one object as a person when the Bhattacharyya distance is a first threshold value or less.

8. The detection method of claim 1, wherein:
- the first virtual count line is set at a position spaced by a predetermined distance from the count line in the first direction, and
- a second virtual count line is set at a position spaced by a predetermined distance from the count line in a second direction that is opposite to the first direction, and
- the step of counting includes incrementing a number of movers in the second direction when the center point of said at least one object sequentially passes the count line and the second virtual count line.

9. The detection method of claim 8, wherein the step of calculating of the feature for the detection of the situation includes:
- calculating a difference between the number of movers in the first direction and the number of movers in the second direction;
- measuring a staying time of a remaining person corresponding to the difference; and
- making a notification when the staying time is a first threshold value or more.

10. The detection method of claim 1, wherein the step of calculating of the feature for the detection of the situation includes:
- calculating a first value that is an extent of a floor area of the frame;
- calculating a second value that is a width of said at least one object; and
- calculating crowd density by using the first value and the second value.

11. The detection method of claim 10, wherein the step of calculating of the first value includes:
- calculating a first area closest to the camera and a second area farthest from the camera in the floor area;
- calculating a first point that is the leftmost point and a second point that is the rightmost point among points of the first area;
- calculating a third point that is the leftmost point and a fourth point that is the rightmost point among points of the second area; and
- calculating a horizontal length and a vertical length of the floor area by using the first point, the second point, the third point, and the fourth point.

12. The detection method of claim 10, wherein the step of calculating of the feature for the detection of the situation further includes detecting crowd forming when the crowd density is a first threshold value or more.

13. The detection method of claim 1, wherein:
- the frame includes a first area, which is spaced from a floor area of the frame by a first height and is spaced from the camera by a first depth, and
- the step of detecting of said at least one object includes:
  - calculating a first threshold value for the first area based on the first height and the first depth; and
  - detecting the first area as an object when a difference between a background model of the frame and the first height is the first threshold value or more.

14. A detection device, comprising:
- an object detecting unit, which detects at least one object by using depth information about an image obtained by a camera;
- an identifying unit, which compares a head candidate area of said at least one object and a 3D head model and identifies whether said at least one object is an object of a target type; and
- a recognition feature calculating unit, which calculates a feature for detection of a situation by using said at least one object when it is identified that said at least one object is the object of the target type, wherein the identifying unit is configured to calculate at least one of a first pixel having a minimum depth value based on the camera among pixels of said at least one object and a second pixel having a maximum height value based on a floor area of the image, and designate a circle area, which is based on at least one of the first pixel and the second pixel having a maximum height value and has a predetermined radius, as a first head candidate area.

15. The detection device of claim 14, wherein:

the identifying unit identifies an object including the first head candidate area among said at least one object as a person when a Bhattacharyya distance between the first head candidate area and the 3D head model is a first threshold value or less.

16. The detection device of claim 14, wherein:

the recognition feature calculating unit sets a first virtual count line and a second virtual count line at positions respectively distanced by a predetermined distance in a first direction and a second direction from a predetermined count line, counts the number of movers in the first direction when the center point of said at least one object passes the count line and the first virtual count line, and counts the number of movers in the second direction when the center point of said at least one object passes the count line and the second virtual count line.

17. The detection device of claim 16, wherein:

the recognition feature calculating unit determines a remaining person by using a difference between the number of movers in the first direction and the number of movers in the second direction, and makes a notification when a staying time of the remaining person is a first threshold value or more.

18. The detection device of claim 14, wherein:

the recognition feature calculating unit calculates a first area closest to the camera and a second area farthest from the camera within a floor area of the image, calculates a first point that is the leftmost point and a second point that is the rightmost point among points of the first area, and a third point that is the leftmost point and a fourth point that is the rightmost point among the points of the second area, calculates a first value that is an extent of the floor area by using the first to fourth points, and calculates crowd density by using the first value and the second value that is a width of said at least one object.

* * * * *